(12) United States Patent
Hanley et al.

(10) Patent No.: US 11,915,220 B2
(45) Date of Patent: Feb. 27, 2024

(54) POINT-OF-SALE TERMINAL FOR DYNAMIC MODE MANAGEMENT OF MULTIPLE CARD READERS

(71) Applicant: Toast, Inc., Boston, MA (US)

(72) Inventors: Tom Hanley, Dublin (IE); Stephen Kirk, County Louth (IE); Chance Ashley Kirsch, Seattle, WA (US)

(73) Assignee: Toast, Inc., Boston, MA (US)

( * ) Notice: Subject to any disclaimer, the term of this patent is extended or adjusted under 35 U.S.C. 154(b) by 246 days.

(21) Appl. No.: 17/215,871

(22) Filed: Mar. 29, 2021

(65) Prior Publication Data

US 2022/0309483 A1 Sep. 29, 2022

(51) Int. Cl.
*G06Q 20/20* (2012.01)
*G06K 7/00* (2006.01)

(52) U.S. Cl.
CPC ......... *G06Q 20/204* (2013.01); *G06K 7/0039* (2013.01)

(58) Field of Classification Search
CPC ............................ G06Q 20/204; G06K 7/0039
See application file for complete search history.

(56) References Cited

U.S. PATENT DOCUMENTS

| 8,376,223 | B2 | 2/2013 | Woronec |
| 9,033,215 | B1 | 5/2015 | Ashford et al. |
| 9,256,768 | B2 | 2/2016 | Gluck |
| 9,864,424 | B1 | 1/2018 | Templeton et al. |
| 10,120,427 | B1 | 11/2018 | Hebner et al. |
| 10,182,328 | B1 | 1/2019 | Maibach et al. |
| 11,182,770 | B1 | 11/2021 | Yan et al. |
| 11,460,849 | B2 | 10/2022 | Deyle et al. |
| 11,538,017 | B2 | 12/2022 | Wallner |
| 11,580,514 | B1 | 2/2023 | Whiteley et al. |
| 11,615,391 | B2 | 3/2023 | Woodyard et al. |
| 2008/0029607 | A1 | 2/2008 | Mullen |
| 2009/0005176 | A1* | 1/2009 | Morrow ............. G07F 17/3239 463/43 |
| 2009/0289117 | A1 | 11/2009 | Lu et al. |
| 2011/0276437 | A1 | 11/2011 | Mullen et al. |
| 2012/0179913 | A1 | 7/2012 | Kirk et al. |
| 2012/0191522 | A1 | 7/2012 | McLaughlin et al. |
| 2012/0330769 | A1 | 12/2012 | Arceo |
| 2014/0001263 | A1 | 1/2014 | Babu et al. |
| 2014/0027506 | A1 | 1/2014 | Heo et al. |

(Continued)

*Primary Examiner* — A. Hunter Wilder
*Assistant Examiner* — Joseph M Mutschler
(74) *Attorney, Agent, or Firm* — Richard K. Huffman; Huffman Patent Group, LLC

(57) ABSTRACT

An apparatus for dynamic credit card reader mode management is provided, the apparatus including: a point-of sale (POS) terminal, configured to accept employee login credentials via a magnetic stripe card, to display menu items for selection, to add selected menu items to an order, and to accept payment for the order, where the payment may be obtained via swipe, dip, or tap, the POS terminal including: a first card reader, configured to read first provided cards when enabled; a second card reader, configured to read second provided cards when enabled; and a dual reader controller, coupled to the first and second card readers, configured to determine one or more workflow states of the POS terminal, and configured to dynamically control modes of the first and second card readers according to the one or more workflow states.

20 Claims, 8 Drawing Sheets

(56) References Cited

U.S. PATENT DOCUMENTS

| | | |
|---|---|---|
| 2014/0097242 A1 | 4/2014 | McKelvey |
| 2015/0242663 A1 | 8/2015 | Babu et al. |
| 2016/0012465 A1* | 1/2016 | Sharp .................. G06Q 20/321 |
| | | 705/14.17 |
| 2016/0171361 A1 | 6/2016 | Chatterton et al. |
| 2016/0335531 A1 | 11/2016 | Mullen et al. |
| 2019/0012661 A1 | 1/2019 | Watson et al. |
| 2020/0184444 A1 | 6/2020 | Gu et al. |
| 2021/0042724 A1 | 2/2021 | Rathod |
| 2023/0081727 A1 | 3/2023 | Okada et al. |
| 2023/0104713 A1 | 4/2023 | Matos |

* cited by examiner

POINT-OF-SALE TERMINAL FOR DYNAMIC MODE MANAGEMENT OF MULTIPLE CARD READERS

CROSS-REFERENCE TO RELATED APPLICATIONS

This application is related to the following co-pending U.S. patent applications, each of which has a common assignee and common inventors, the entireties of which are herein incorporated by reference.

| SERIAL NUMBER | FILING DATE | TITLE |
|---|---|---|
| 17215787 (TST.0173) | Mar. 29, 2021 | APPARATUS AND METHOD FOR CONTEXT-BASED CREDIT CARD READER POWER MANAGEMENT |
| 17215949 (TST.0175) | Mar. 29, 2021 | POINT-OF-SALE SYSTEM FOR DYNAMIC MODE MANAGEMENT OF MULTIPLE CARD READERS |
| 17216013 (TST.0176) | Mar. 29, 2021 | APPARATUS AND METHOD FOR DYNAMIC ADAPTATION OF CREDIT CARD READER COMMUNICATIONS PROTOCOLS |

BACKGROUND OF THE INVENTION

Field of the Invention

This invention relates in general to the field of point-of-sale (POS) systems, and more particularly to improved card reader apparatus and methods.

Description of the Related Art

It is rare these days to walk into a retail store or restaurant that has a manually-operated cash register along with manual (i.e., paper and pencil) order entry. Rather, it is more common to find one or more electronic point-of-sale (POS) terminals through which a guest may order goods and/or services. Whether the terminals are employed in a fixed position or hand carried by wait staff, the advantages over prior manual entry mechanisms are pronounced and include more accurate presentation of goods and services, accurate and up to date pricing, customized loyalty presentations, automated transmission of orders for fulfillment, and automated payment processing. Many of these POS terminals have credit card readers either attached via wiring or integrated into the same housing as the circuits and devices associated with the POS terminals. Some of the POS terminals may operate on rechargeable battery power and some may be powered via AC mains. In addition, some of the POS terminals may have a single display and corresponding credit card reader and some may have both an employee-facing display with corresponding reader along with a guest-facing display with corresponding reader. As a result of the recent COVID pandemic, health and sanitization concerns have driving many restaurants toward the use of so-called dual-display, dual-reader configurations, where many of the functions (e.g., menu item selection, swiping of loyalty cards and gift cards, and payment via debit or credit cards via swipe, dip, or tap) formerly performed by employees are now performed by guests.

As one skilled in the art will appreciate, credit card readers often adhere to manufacturer-specific protocols (e.g., synchronous control, asynchronous control) and data formats (e.g., track data format, etc.) and, because they are devices that are subject to food service environments, they occasionally fail and must be replaced, sometimes with a different model of card reader.

One skilled in the art will also appreciate that the introduction of card readers that accept credit cards according to Europay, MasterCard, and Visa (EMV) standards (more commonly known as "smart chip" cards or just "chip" cards) has proved to be a significant challenge to system designers because of the substantial amount of additional power that is required for card readers that provide for contactless reading ("tap") of these cards, which substantially reduces the usage time between charges and overall battery life for battery-operated terminals.

One skilled will further appreciate that situations arise during a POS terminal's workflow (i.e., show menus, allow for order entry, require payment, require manager approval, enter loyalty information, etc.) where enablement of both readers in a dual-display, dual-reader configuration may be confusing to both employees and guests.

Therefore, what is needed is apparatus and methods for context-based credit card reader power management that minimizes battery drain during a POS workflow which at the same time providing guests with the ability to pay at virtually any time after placing an order.

What is also needed is a POS terminal that dynamically controls the state of multiple card readers according to POS workflow state.

What is further needed is a POS system that dynamically controls the state of multiple card readers according to POS workflow state.

What is additionally needed is apparatus and methods for dynamic adaptation of credit card reader communications protocols.

SUMMARY OF THE INVENTION

The present invention, among other applications, is directed to solving the above-noted problems and addresses other problems, disadvantages, and limitations of the prior art, by providing improved techniques for power management, state control, and interface to one or more credit card readers.

One aspect of the present invention contemplates an apparatus for dynamic credit card reader mode management, the apparatus including: a point-of sale (POS) terminal, configured to accept employee login credentials via a magnetic stripe card, to display menu items for selection, to add selected menu items to an order, and to accept payment for the order, where the payment may be obtained via swipe, dip, or tap, the POS terminal including: a first card reader, configured to read first provided cards when enabled; a second card reader, configured to read second provided cards when enabled; and a dual reader controller, coupled to the first and second card readers, configured to determine one or more workflow states of the POS terminal, and configured to dynamically control modes of the first and second card readers according to the one or more workflow states.

Another aspect of the present invention envisages an apparatus for dynamic credit card reader mode management, the apparatus including: a point-of sale (POS) terminal, configured to accept employee login credentials via a magnetic stripe card, to display menu items for selection, to add selected menu items to an order, and to accept payment for the order, where the payment may be obtained via swipe, dip, or tap, the POS terminal including: a first card reader, configured to read first provided cards when enabled; a second card reader, configured to read second provided cards when enabled; a dual reader controller, coupled to the first and second card readers, configured to determine one or more workflow states of the POS terminal, and configured to dynamically control mode of the first and second card readers according to the one or more workflow states; and an order processor, coupled to the dual reader controller, configured to set the workflow state of the POS terminal based upon commands received from a backend server and entries via touchscreens that are disposed within the POS terminal, where the backend server is not on-premise with the POS terminal.

An addition aspect of the present invention comprehends a method for dynamic credit card reader mode management, the method including: providing a point-of sale (POS) terminal that is configured to accept employee login credentials via a magnetic stripe card, to display menu items for selection, to add selected menu items to an order, and to accept payment for the order, where the payment may be obtained via swipe, dip, or tap; via a first card reader disposed as part of the POS terminal, first reading first provided cards when fully powered and enabled; and via a second card reader disposed as part of the POS terminal, second reading second provided cards when fully powered and enabled; and via a dual reader controller that is coupled to the first and second card readers, determining one or more workflow states of the POS terminal, and dynamically controlling modes of the first and second card readers according to the one or more workflow states.

BRIEF DESCRIPTION OF THE DRAWINGS

These and other objects, features, and advantages of the present invention will become better understood with regard to the following description, and accompanying drawings where.

DETAILED DESCRIPTION

Figure 1:
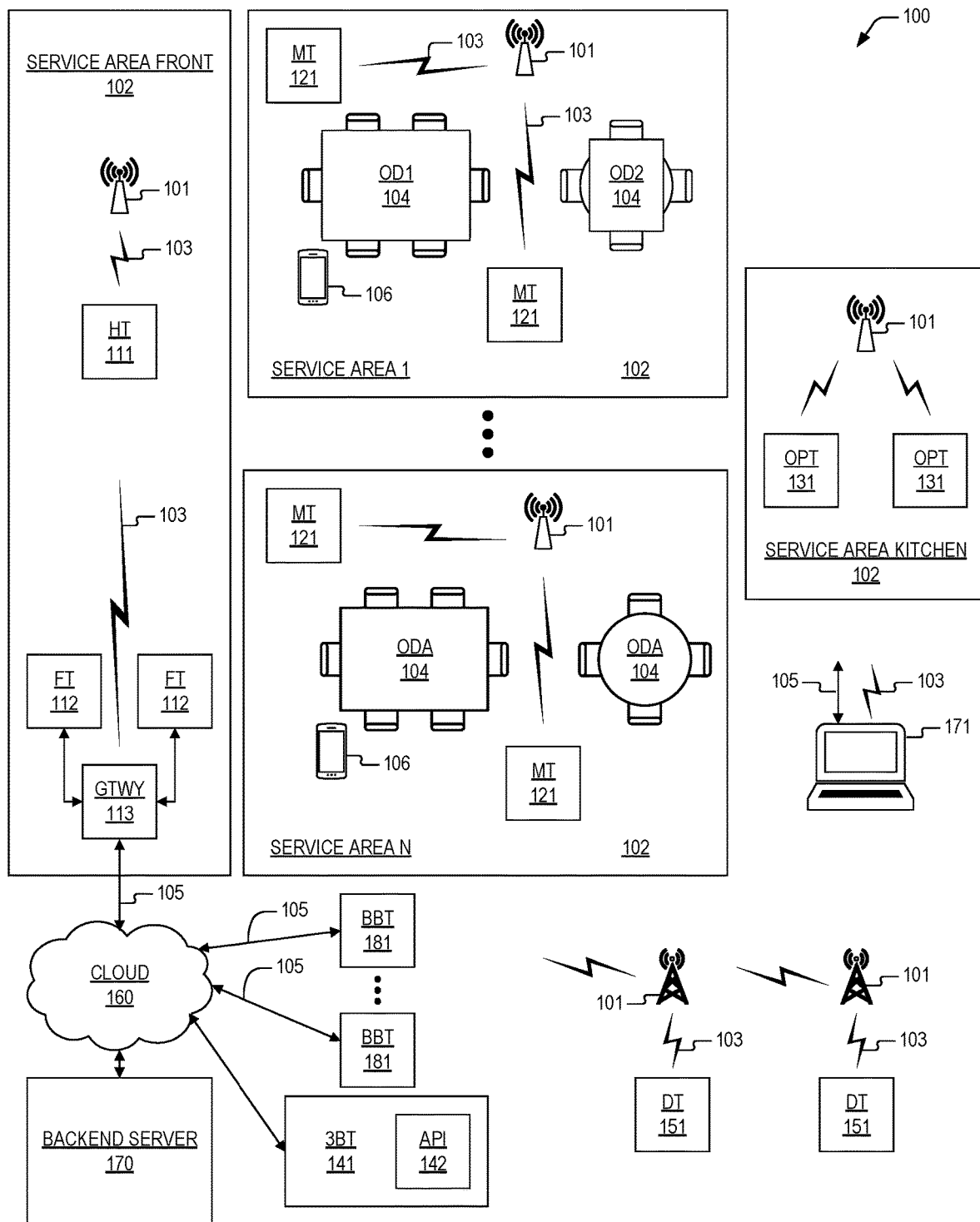
FIG. 1 is a block diagram illustrating an internet-based POS synchronization system according to the present invention.

Exemplary and illustrative embodiments of the invention are described below. It should be understood at the outset that although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application," "application," "application program," "app," "computer program," or "program") by performing operations on data, where the operations may include arithmetic operations, logical operations, or input/output operations. A CPU may also be referred to as a "processor."

Module: As used herein, the term "module" may refer to, be part of, or include an application specific integrated circuit (ASIC), an electronic circuit, a processor (shared, dedicated, or group) and/or memory (shared, dedicated, or group) that execute one or more computer programs, a combinational logic circuit, and/or other suitable components that provide the described functionality.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Internet: The Internet is a global wide area network connecting computers throughout the world via a plurality of high-bandwidth data links which are collectively known as the Internet backbone. The Internet backbone may be coupled to Internet hubs that route data to other locations, such as web servers and Internet Service Providers (ISPs). The ISPs route data between individual computers and the Internet and may employ a variety of links to couple to the individual computers including, but not limited to, cable, DSL, fiber, and Wi-Fi to enable the individual computers to transmit and receive data over in the form of email, web page services, social media, etc. The Internet may also be referred to as the world-wide web or merely the web.

In view of the above background discussion on POS terminals and associated techniques employed within present-day systems power management and control of one or more card readers therein, a discussion of the present invention will now be presented with reference to FIGS. 1-8.

Turning to FIG. 1, a block diagram is presented illustrating an internet-based POS synchronization system 100 according to the present invention. The synchronization system 100 may include one or more service areas 102, such as a front service area 102, service area 1-service area N 102, and service area kitchen 1021. Hereinafter, restaurant terms such as host, wait staff, cook, kitchen, food item, etc. may be employed to clearly teach the present invention in a given context; however, broader and different retail establishment types are contemplated.

The service areas 102 may comprise one or more wireless access points 101. The service areas 102 may also comprise one or more wireless POS terminals 111, 121, 131, coupled to the access points 101 via wireless links 103, and which are distinguished in the system 100 as a host terminal 111, battery-operated and rechargeable mobile terminals 121, and order processing terminals 131. Typically, the mobile POS terminals 121 are of an 8-inch handheld display size, though other sizes are contemplated, and may comprise integral card readers of various types and capabilities such as, but not limited to, swipe only; swipe and dip; and swipe, dip, and tap. The host terminals 111 may be coupled to the access points 201 via wireless links 103. Alternatively, the host terminals 111 may be hardwired and may be either battery-operated or powered via AC mains. The service areas 102 fixed terminals 112 are hardwired to a gateway 113 and preferably are powered via AC mains. Alternatively, one or more of the fixed terminals 112 may be coupled to the access points 101 via the wireless links 103. Typically, the host terminals 111 and fixed terminals 112 are approximately of a 15-inch POS display size, though other sizes are contemplated. The fixed terminals 112 may have a single employee-facing display with corresponding card reader that is integrated into the fixed terminals 112 or that is free standing and coupled to the fixed terminals 112. Alternatively, the fixed terminals may have both an employee-facing display with corresponding card reader that is integrated into the fixed terminals 112 or that is free standing and coupled to the fixed terminals 112 and a guest-facing display with corresponding card reader that is integrated into the fixed terminals 112 or that is free standing and coupled to the fixed terminals 112. Accordingly, a fixed terminal 112 with a single display and single card reader may be referred to as a single-reader fixed terminal 112. A fixed terminal 112 with two displays and corresponding card readers may be referred to as a dual-reader fixed terminal 112

The order processing terminals 131 are coupled to the access points 101 via the wireless links 103 and are powered via AC mains. Alternatively, the order processing terminals 131 may be hardwired to the gateway 113. Typically, the order processing terminals 131 are approximately of a 22-inch display size for ease of use in a kitchen 102 or other order processing area 102, though other sizes are contemplated. Thus, the mobile terminals 121 are referred to as such because they are battery powered and thus capable of being easily moved about the service areas 102. As a result, the mobile terminals are all coupled to the access points 101 via the wireless links 103. The host terminal 111 may be moved about the services areas 102 as well, in which case it will be categorized as mobile, though having a larger display size generally than the mobile terminals. Or the host terminal 111 may be in a fixed location, typically mounted to a stand (not shown), and may be wireless or hardwired. When in a fixed location, the host terminal 111 is categorized as fixed.

The gateway 113 provides for coupling of the terminals 112 (optionally, 121, 131) that are hardwired and access points 101 an internet cloud 160 (also referred to "the internet," "the world-wide web," or "the web") via conventional wired links 205 such as, but not limited to, Ethernet, cable, fiber optic, and digital subscriber line (DSL). As part of the network path to and through the cloud 160, providers of internet connectivity (e.g., ISPs) may employ wireless technologies from point to point, etc., but for purposes of this application, such links 105 will be referred to as conventional wired links 105 to distinguish them from local and cellular wireless links. The wireless links 103 may comprise, but are not limited to, Wi-Fi, Bluetooth, near field communications, infrared links, IEEE 802.15.4, Zigbee radio links, and cellular based links (e.g., 3G, 4G, LTE, 5G) or a combination of the noted links. The POS terminals 111, 112, 121, 131 may be configured differently to comport with intended function (i.e., host seating, order entry, order fulfillment, payment processing, owner engagement, etc.), or they may be configured similarly. The host terminal 111, fixed terminals 112, and order processing terminals 131 may comprise larger touch screens to allow for easier viewing by restaurant staff, or they may comprise displays with keyboard entry. In one embodiment, terminals 111, 112, 131 may comprise desktop computers, laptop computers, smartphones, or tablets that are running special-purpose application programs or special-purpose web-enabled application programs that provide for communication with a backend server 170 for purposes of order entry, status updates, and payment processing.

The backend server 170 is coupled to the internet cloud 160 and to an administrative console 171 that is operably coupled to the backend server 170 via a conventional wired link 105 and/or a wireless link 103. The backend server 170 is not located on-premise with the POS terminals 111, 112, 121, 131 and is thus referred to as a cloud server 170.

The administrative console 171 may be disposed within the restaurant premises and coupled to the backend server 170 via the links 103, 105, or the console 171 may be disposed in another location, say, at an operations center for multiple restaurants within a given region. In addition, the system 100 may comprise one or more browser-based terminals 181 that are also not on-premise with the POS terminals 111, 112, 121, 131 and that are coupled to the backend server 170 via links 105. In one embodiment, the browser-based terminals 181 may comprise desktop computers, laptop, computers, smartphones, or tablets that are running stand-alone applications or web-enabled applications that provide for communication with the backend server 270 for purposes of order entry, status updates, and payment processing, where payment data is manually entered as opposed to being swiped, dipped, or tapped.

The system 100 may further comprise one or more third-party-based terminals 141 that are coupled to the backend server 170 via the conventional links 105 though the cloud 160. The third party-based terminals 141 may comprise desktop computers, laptop, computers, smartphones, or tablets that are running stand-alone third-party applications or web-enabled third-party applications that provide for communication with the backend server 170 for purposes of order entry, status updates, and optionally, payment processing via a proprietary application programming interface (API) 142. An example of such a terminal 141 may include the well-known GrubHub® third-party application that is configured to communicate with the backend server 170 via the API 142.

The system 100 may additionally comprise one or more mobile delivery terminals 151 that are coupled to one or more cellular access points 101 via conventional cellular wireless links 103, and the cellular access points 101 are coupled to the backend server 170 via the cloud 160. In one embodiment, the delivery terminals 251 are identical to the mobile terminals 121, and are configured to provide services for order entry, order fulfillment (i.e., delivery), and payment processing. In another embodiment, the delivery terminals 151 are disposed as smartphone or tablets with a detachable payment processor (e.g., card/chip/tap reader). In a further embodiment, the delivery terminals 151 are disposed as smartphone or tablets with a payment processor integrated within a single housing. Other embodiments are contemplated.

Service areas 102 corresponding to the mobile terminals 121 may have one or more tables 104 corresponding to one or more orders. For clarity, service area 1 102 depicts two tables 204, one of which corresponds to order 1 OD1, and the other of which corresponds to order 2 OD2. The mobile terminals 121 within service area 1 102 may processes portions of both order 1 OD1 and order 2 OD2. Service area N 102 depicts two tables 104, both of which correspond to order A ODA. The mobile terminals 121 within service area N 2102 may both process portions order A ODA. Though disposed within separate service areas (service area 1 102-service area N 102), the mobile terminals 121 therein may be further configured to process portions of any and all orders within the restaurant and may roam from service area 102 to service area to support workload of the restaurant.

The order processing terminals 131 may process all orders in the restaurant, or they may be configured to each process a portion of all of the orders in the restaurant according to preparation station or inventory station.

The host terminal 111 and fixed terminals 112 may be configured to process all orders in the restaurant to provide for on-premise seating assignment, order initiation, order selection, and payment processing, including closeout of orders.

One or more of the terminals host terminals 111, fixed terminals 112, mobile terminals 121, and order processing terminals 131 may be configured in an owner mode as will be described in further detail below, to allow an owner of the restaurant to transmit and receive messages from the backend server 170 that are relevant to management of the restaurant. The types of functions that are enabled when in owner mode may include POS subscription services management, views of POS totals and statistical metrics for programmable periods (e.g., daily, weekly, monthly, yearly), comparisons of POS totals and statistical metrics from two or more programmable periods (e.g., Q1 2018, Q1 2019, Q1 2020), views of fixed and variable POS subscriber charges (including credit card processing fees and terms for originated capital products), communications with POS subscription support staff and regional representative, and dynamic capital product offers and terms.

One or more restaurant staff members (not shown) within service area 1 102-service area N 102 may have a personal device (e.g., smartphone, tablet, laptop) 106 that can provide an ad hoc network (i.e., hotspot) to which one or more of the mobile terminals 121 may tether for purposes of communicating with the backend server 170 in the absence of Wi-Fi connectivity to the access points 101.

In one embodiment, operations are initiated when the one or more guests enter the restaurant. Generally, a host (not shown) will create an order (along with corresponding order identifier (OID) via the host terminal 111 for the one or more guests and will seat the guests at one or more tables 104. The created order may include service area designation and assignment of the order to one or more mobile terminals 121. In another embodiment, mobile terminals 121 within a service area 102 are assigned to all orders within that service area 102. Other embodiments are contemplated. The created order and service area assignment are transmitted over the cloud 160 to the backend server 170, which maintains durable terminal queues within which are stored order updates for all orders in the restaurant. Each of the plurality of durable terminal queues corresponds to each of the POS terminals 111, 112, 121, 131, 151 within the system 200.

When connection status to a given terminal 111, 112, 121, 131, 151 is down (i.e., the server 170 cannot verify communication with the given terminal 111, 112, 121, 131, 151), then the server 170 maintains the order updates for that terminal 111, 112, 121, 131, 151 until connectivity is reestablished, at which time the server 170 may transmit one or more of the order updates to the terminal 111, 112, 121, 131, 151, verifying with each transmission that the terminal 111, 112, 121, 131, 151 received the update. Advantageously, each of the terminals 111, 112, 121, 131, 151 is capable of processing portions of any of the orders in the restaurant.

Likewise, each of the terminals 111, 112, 121, 131, 151 maintains durable order queues within which are stored order updates only for each of the orders being processed by the terminal 111, 112, 121, 131, 151. Each of the terminals 111, 112, 121, 131, 151 also maintains a plurality of order states that depict a current state for each of the orders in the restaurant. As a guest selects one or more menu items, wait staff enters the menu items as an update in one of the terminals 111, 112, 121, 131, 151, generally a mobile terminal 121 assigned to the given service area 102. The order update is entered into one of the durable order queues that corresponds to the order ID. If connectivity is present, then the terminal 111, 112, 121, 131, 151 transmits the order update to the server 170 and waits for the server 170 to acknowledge the order update. If acknowledged, the terminal 111, 112, 121, 131, 151 removes the order update from the one of the durable order queues. If unacknowledged (i.e., in the case of non-persistent network connectivity), the terminal 111, 112, 121, 131, 151 maintains the order update in the one of the durable order queues until such time as connectivity is reestablished, and the terminal 111, 112, 121, 131, 151 completes transmission of the order update with acknowledgement by the server 170.

Upon reception of a particular update from the server 170, the terminals 111, 112, 121, 131, 151 may check one of their plurality of order states that correspond to the particular update for conflicts. If a conflict exists, the terminals 111, 112, 121, 131, 151 may utilize domain specific rules to resolve the conflict in order to establish a valid order state. Each of the terminals 111, 112, 121, 131, 151 is configured with the same domain specific rules to provide for consistent resolution of order states.

As guests continue to order items corresponding to the order ID, the one or more of the terminals 111, 112, 121, 131, 151 may enter the order updates and transmit/durably queue the order updates to the server 170 in accordance with connectivity conditions. The server 170 may also queue/transmit order updates for all orders in the restaurant to each of the terminals 111, 112, 121, 131, 151 according to each terminal's connectivity. Order fulfillment, payment, and closeout are likewise handled as order updates through the server 170 and are queued/transmitted to all of the terminals 111, 112, 121, 131, 151 in accordance with the connection status of each terminal.

Guests outside of the restaurant are handled in similar fashion via the browser-based terminals 181, and third-party terminals 141, though without synchronous feedback from the server 170 regarding all orders in the restaurant. When accessed through the browser-based terminals 181 and third-party terminals 141, the server 170 creates and order ID and assigns it to one of the order processing terminals 131 for fulfillment, while sending status updates on the order ID to all of the terminals 111, 112, 121, 131, 151 via the durable terminal queue therein. The server 170 may designate a specific delivery terminal 151 for pickup, delivery, and payment based upon geofenced proximity to the restaurant, or based upon workload corresponding to the delivery terminal. Proximity to the restaurant may be determined by a number of different mechanisms, as will be described in further detail below.

The administrative console 171 may maintain a master record of all order states and order updates according to all of the terminals 111, 112, 121, 131, 151 in order to provide for restaurant management, maintenance, analytics, and network traffic analyses. The console 171 may alternatively be disposed in an expediter's area of the restaurant for use by expediters in assignment and allocation of guest seating and terminals 111, 112, 121, 131, 151. The console 171 may further be configured to operate in an owner mode, as described above.

The durable terminal queues and durable order queues may be disposed as battery-backed random-access memory, electrically-erasable programmable read-only memory, solid state memory, hard disk memory, or a combination of the above that will provide for maintaining order updates within the queues across network and power interruptions.

Advantageously, the present invention provides for more efficient use of computational resources and order processing within the server 170 and the POS terminals 111, 112, 121, 131, 151 over that which has heretofore been provided because multiple 111, 112, 121, 131, 151 may be assigned to process portions of a single order, resulting in more timely processing of the single order. Similarly, any of the terminals 111, 112, 121, 131, 151 in the restaurant may be immediately reassigned to a particular order to replace a malfunctioning terminal or to increase throughput of the server 170. Accordingly, computational resources within the system 200 are afforded an overall performance improvement as a result of the present invention.

As alluded to above, the introduction of card readers that accept credit cards according to Europay, MasterCard, and Visa (EMV) standards (more commonly known as "smart chip" cards or just "chip" cards) has proved to be a significant challenge to system designers because of the substantial amount of additional power that is required for card readers that provide for contactless reading ("tap") of these cards. As one skilled in the art will appreciate, this additional power is required to power radio circuits in the card readers that enable tap capability. To provide guests with the ability to pay via tap at any time from placing an order through the end of their meal, the present inventors have noted a 50 percent reduction on average in time between battery charges, thus resulting in a significant decrease in battery life, which leads to additional maintenance requirements and equipment cost in an industry that exhibits increasingly small profit margins. As one skilled in the art will appreciate, batteries have a finite lifetime that is a function of the number of charges. At the end of that lifetime, they must be replaced. Consequently, increased battery drain on a daily basis necessitates more terminal charges, which adds costs in terms of parts (batteries) and labor to replace those parts. Furthermore, user experience is disadvantageously impacted because of the requirement to recharge more often than has heretofore been provided.

Add to this the complications resulting from POS terminal configurations that comprise two touchscreen displays (i.e., employee facing and guest facing) with corresponding card readers. Up until the COVID pandemic, these dual-display, dual-reader configurations accounted for only a small fraction of the overall number of POS terminals; however, growth in their numbers along with requirements for contactless payments is increasing exponentially, and the present inventors have observed a need to provide techniques for controlling multiple readers in a manner that supports a wide variety of reader protocols.

Figure 2:
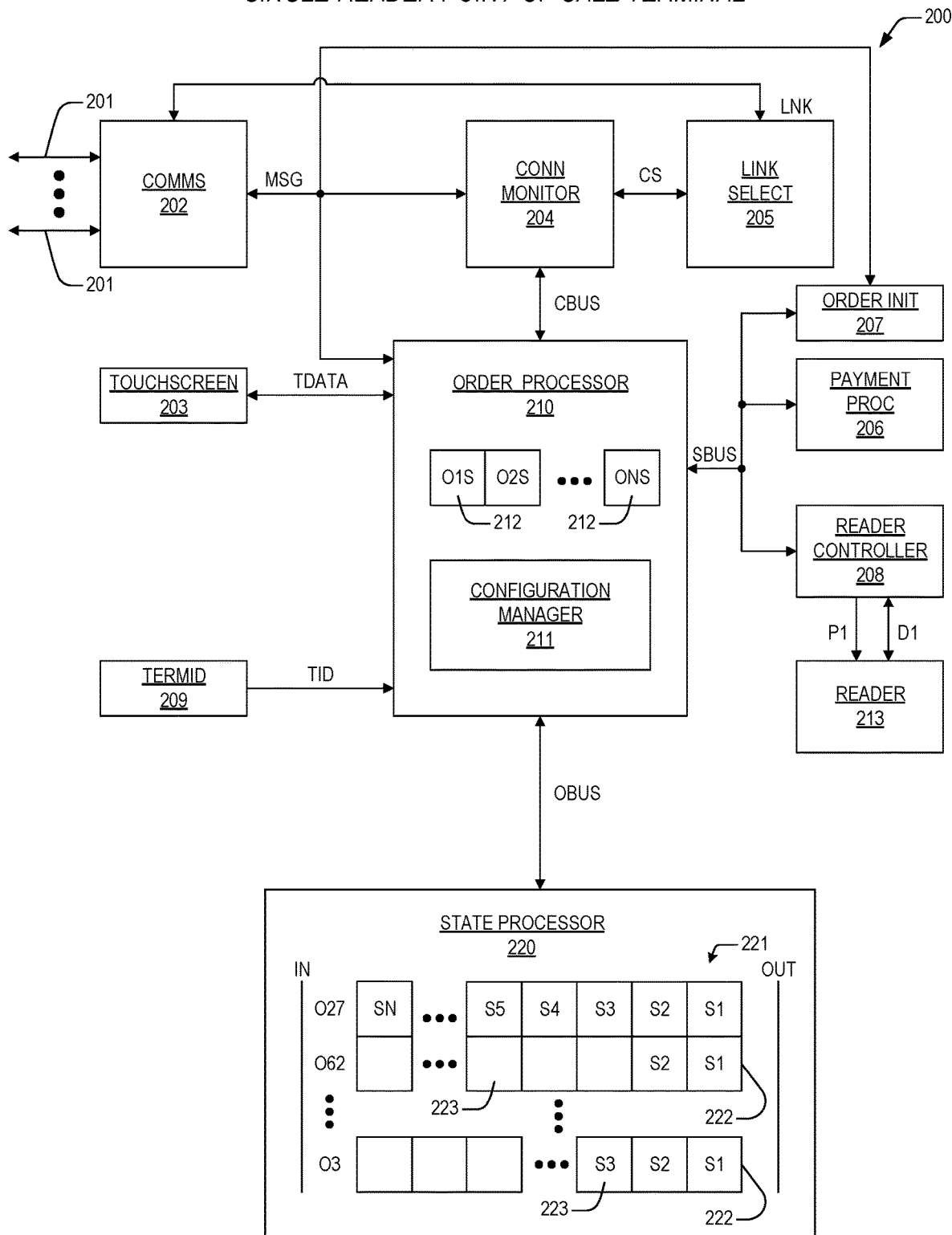
FIG. 2 is a block diagram depicting a single-reader POS terminal according to the present invention such as may be employed in the POS synchronization system of FIG. 1.

Referring now to FIG. 2, a block diagram depicting a single-reader POS terminal 200 according to the present invention such as may be employed in the POS synchronization system of FIG. 1. For purposes of teaching aspects of the present invention, the POS terminal 200 may be disposed as a battery-operated POS terminal (mobile or fixed configuration) or as a POS terminal (preferably fixed configuration) 200 powered via AC mains. When in a fixed configuration, the POS terminal 200 may be hardwired to a gateway or may be coupled to the gateway via wireless access points, as described above with reference to FIG. 1. The terminal 200 may comprise a communications circuit COMMS 202 (e.g., transceivers, modems, message formatter, etc.) that is coupled to one or more wired or wireless communications links 201, examples of which are described above with reference to FIG. 1. The terminal 200 may also comprise a connection monitor 204, an order processor 210, and an order initiation element 207, all of which are coupled to COMMS 202 via a message bus MSG. The terminal 200 may also comprise a link select element 205 that is coupled to the connection monitor 204 via bus CS and to the COMMS 202 via bus LNK. The order processor 210 is coupled to the connection monitor 204 via bus CBUS and to the order initiation element 207, a payment processor 206, and a reader controller 208 via bus SBUS. The reader controller 208 is coupled to a card reader 213 that may provide one or more of the capabilities (i.e., swipe, dip, tap) described above. Preferably, the card reader 213 provides all three capabilities. The order processor 210 is coupled to a touchscreen display 203 via bus TDATA and to a terminal ID element 209 via bus TID. The order processor 210 is also coupled to a state processor 220 via a queue bus QBUS.

The state processor 220 may include a durable order update queue 221 that includes order update records 222, each of which are associated with a corresponding order for the terminal 200. Individual terminals 200 are identified by their corresponding terminal ID, which may be stored within and accessed from the terminal ID element 209. The terminal ID element 209 also is employed for storage and retrieval of terminal configuration information (e.g., order processing terminal configuration, kiosk configuration, mobile terminal configuration, host terminal configuration, owner mode terminal configuration, etc.).

Each of the order update records 222 may comprise order state fields 223, which are employed to queue order state changes (i.e., order updates) for transmission to a backend server (not shown) as connectivity to the backend server permits. State fields 223 nearest to OUT are the oldest order state changes queued for transmission to the backend server. State fields 223 nearest to IN are youngest (or most recent) order state changes queued for transmission to the backend server. Fields 223 between the oldest state fields 223 and the youngest state fields 223 descend in age from oldest to youngest order state change according to when those state changes are entered by the terminal 200.

Values of the order state fields 223 may include, but are not limited to, an order ID along with order details taken by the terminal 200. Accordingly, the order update record 222 for order 27 O27 depicts a plurality of order state fields 223 to be transmitted to the server when connectivity is reestablished. In decreasing age from oldest to youngest order state change, the fields 223 depict order state changes S1 through SN. As one skilled in the art will appreciate, the order update record 222 O27 depicts that many more state changes have been entered while connection status of the terminal 200 is down than have been entered for order 62 O62 through order 3 O3. Advantageously, the terminal 200 according to the present invention may be employed for entry of order updates even in the presence of network interruptions (which are characteristic of most Wi-Fi networks).

In operation, order state changes S1-SN result from two sources: the touchscreen 203 and messages received over COMMS 302 from the backend server. In the first case, wait staff may enter menu items as requested by guests, or in the case that the terminal 200 is configured as a kiosk 200, the guests may enter the order items themselves. The present invention contemplates provisions within the terminal 200 to display menu selections and payment options to both wait staff and guests. Order items received from the touchscreen display 203 are provided to the order processor 210 via bus TDATA, which generates the state changes. State changes S1-SN received from the backend server are provided to the order processor 210 via messages received over bus MSG. The terminal 200 may be further configured as a tableside kiosk 200 that is unattended, such as in found in some restaurants and activity concepts like bowling alleys, golf gaming venues (e.g., Topgolf). As a tableside kiosk 200, guests are enabled to add to existing orders to purchase additional items. The terminal 200 may further be configured to operate in an owner mode that comprises the owner functions discussed above with reference to FIG. 1.

The connection monitor 204 may monitor reception of a first message (e.g., a ping message) from the backend server and direct transmission of an acknowledgement message. The connection monitor 204 may update the connectivity status of the terminal 200 accordingly. In one embodiment, acknowledgment may comprise a simple acknowledge message. In other embodiments, acknowledgement may comprise additional data such as received signal strength indication RSSI associated with one or more access points, number of hops between the backend server and the terminal 200, or Global Positioning System (GPS) coordinates.

The link select element 205 may be employed to direct the COMMS 202 to change links 201 over which to communicate with the backend server, such as switching from Wi-Fi to LTE, for example. In one embodiment, in the absence of connectivity within the restaurant, the link select element 205 may direct the COMMS 202 to tether to a cellular equipped device corresponding to an order ID, such as device 106 in FIG. 1, in order to transmit acknowledgements and order state changes to the backend server.

The connection monitor 204 may provide connectivity status of the terminal 200 to the order processor 210 via bus CBUS. In one embodiment, the order processor 210 may generate order state change messages from oldest to youngest update for each of the orders in the queue 221. Connectivity is maintained when the terminal 200 receives acknowledgement of a previously transmitted order state change message from the backend server. Once acknowledged, the order processor 210 directs the state processor 220 to delete the oldest state change update for a corresponding order ID and shift pending updates so that the next oldest state change update becomes the oldest order update. In one embodiment, state change updates are transmitted to the backend server until its order state change record 222 is empty, or until connectivity goes down.

As discussed above, the terminal 200 may be configured as a fixed or mobile POS terminal, a kiosk, a host terminal, a management terminal, an order processing terminal, or an owner mode terminal, where configurations differ principally in size of the touchscreen display 203 and configuration of displayed items and available functions and controls. The configuration parameters for the terminal 200 are stored in the terminal ID 209 element, and the configuration parameters/features are accessed by a configuration manager 211 within the order processor 210 upon initialization/ reconfiguration of the terminal 200. Thus, the configuration manager 211 may generate images for display on the touchscreen 203 and capture text and touches thereon, in accordance with functions prescribed according to configuration parameters/features accessed from the terminal ID element 209.

Messages received from the communications circuit 202 may also require additional functions to be performed by the terminal 200. For example, when orders are placed by a browser-based or third-party based terminal, the backend server may transmit the order state change to the terminal 200 and the order processor 210 may direct the state processor 220 to create a corresponding order status record 222 in the queue 221. Similarly, when processing of transactions outside of the terminal's capabilities (e.g., financial transactions with credit card processors, loyalty card discounts, customer relationship management functions, etc.) are required, order processor 210 may direct the payment processor 206 to generate messages to the backend server to provide data (e.g., amounts, payment source type, card swipe/chip information, etc.) to complete the transactions. Such messages are transmitted via COMMS 202.

Based upon directives from the order processor 210, the payment processor 206, via SBUS, may direct the reader controller 208 to perform any of a number of functions associated with a card reader 213 including, but not limited to, swipe login for employees; swipe for manager approval of a transaction; swipe for guest age verification, swipe or dip for gift card; and swipe, dip, or tap for credit card payment. In one embodiment, the reader 213 is coupled to the reader controller 208 via a power bus P1 and a bidirectional data bus D1. The power bus P1 is employed to provide operating power to the reader 213 and the data bus D1 is employed to transmit commands to the reader 213 to change state, as will be described in more detail below, and to receive data from the reader 213 that is obtained during a swipe, dip, or tap operation. In accordance with the directives, the reader controller 208 may place the reader 213 in a state to accept a swipe, to accept a dip, to expect a tap, or to accept any combination of swipe, dip, and tap commensurate with workflow of the terminal 200. The reader controller 208 may further direct the reader 213 via D1 to go into a standby state, where the reader 213 is powered up but unable to accept information from a swipe, dip, or tap. In an embodiment where the terminal 200 is battery-operated, the reader controller 208 may additionally turn the reader 213 to an off state by removing power altogether from the power bus P1. In one embodiment, buses P1 and D1 are disposed within a conventional Universal Serial Bus (USB) cable interface that operates in accordance with USB 2.0/3.0 protocol standards. As such, the reader controller 208 may obtain the type and capabilities of the reader 213 upon conventional power up discovery techniques.

The reader controller 208 according to the present invention may further be configured to couple via P1 and D1 to one of several different types of readers 213 having differing data formats and interface protocols (e.g., asynchronous, synchronous, etc.) and may perform translation of directives received from the order processor 210 into reader-specific commands that correspond to reader type and capabilities obtained during USB discovery to direct the reader to perform the functions noted above. Likewise, the reader controller 208 may receive reader-specific formatted data (including card information) from the reader 213 and may translate the reader-specific formatted data into a common format for presentation to the order processor 210 via SBUS.

The reader processor 208 may additionally direct the reader 213 to change operating state based upon workflow state of the POS terminal 200 and may further power down the reader 213 for workflow states that do not require reader functions in order to minimize battery drain. These operating state changes will be described in further detail below. As an example, when the POS terminal 200 is expecting an employee login, the reader controller 208 may place the reader in a full power mode and direct the reader 213 to expect a swipe. If no swipe is received in a programmable period of time, then the reader controller 208 will place the reader in a power off mode by removing power from P1. If a user re-enables a login (by touching a "login" icon on the touchscreen 203), then the reader controller 208 may place the reader in a full power mode and direct the reader 213 to expect a swipe.

The payment processor 204 may further receive state changes (e.g., "order paid," "payment source 1 approved," "discount amount," etc.) from the backend server via SBUS. The order processor 210 may then provide those updates to the queue 221 via OBUS. The POS terminal 200 may further be employed to create an order. Accordingly, from order entry data received over TDATA, the order processor 210 may direct the order initiation element 207 to request an order ID from the backend server via MSG and may also direct the state processor 320 to create a corresponding order state record 222 in the queue 221 based upon the order ID received from the backend server.

The POS terminal 200 according to the present invention is employed to maintain a current state of all orders being fulfilled by the restaurant. The current state of each of the orders is stored in order current state fields 212 within the order processor 210. The order processor 210 may also comprise domain specific rules (not shown), which define actions required to synchronize conflicting order state changes being received and/or processed by the terminal 200, where the domain specific rules are unique to the restaurant. For example, suppose that one terminal 200 transmits a state change for a specific order to the backend server, which is acknowledged by the backend server. Concurrently, a second terminal 200 sends a state change for the same order. The backend server may respond to the second terminal with a message indicating that the order current state field 212 for the order ID within the second POS terminal 200 state is out of date (due to connection status) and providing the most recent current state of the order. The domain specific rules are employed by the order processor 210 within the second terminal 200 to merge the state changes local to the second terminal 200 and may store the merged state in the corresponding current state field 212. The order processor 210 may then direct the COMMS 202 to transmit the corresponding (reconciled) state field 212 contents to the backend server for distribution to all of the terminals 200 in the restaurant.

Advantageously, the present invention provides for improvements in increased utility and performance of the POS terminals 200 over that which has heretofore been provided because the terminal 200 may be employed to process orders in the absence of network connectivity. In addition, unnecessary communications with the backend server are precluded due to on-board conflict resolution logic (not shown). Moreover, utility and efficiency are increased because the terminal 200 may be employed to process any of the other orders within the restaurant because the current states of all restaurant orders are resident therein. Furthermore, battery life is increased by dynamically managing power to the reader 213 so that it is fully powered only when required and by dynamically managing reader state to minimize power drain. Moreover, the POS reader 200 according to the present invention provides for seamless interface to any of a number of reader types and protocols, thus decreasing maintenance costs.

The terminal 200 according to the present invention is configured to perform the functions and operations as discussed above. The terminal 200 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 200 may be shared with other circuits, microcode, etc., that are employed to perform other functions and/or operations within the terminal 200. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The terminal 200 may be embodied as one or more central processing units (CPUs) that are coupled to transitory and non-transitory storage (i.e., memory), where one or more application programs that are configured to perform the functions discussed above are stored in the non-transitory storage, transferred to the transitory storage at run time, and executed by the one or more CPUs. The memory may comprise an operating system (OS), such as Android, iOS, MS Windows Mobile, etc. and one or more application programs that implement the functions noted above.

Figure 3:
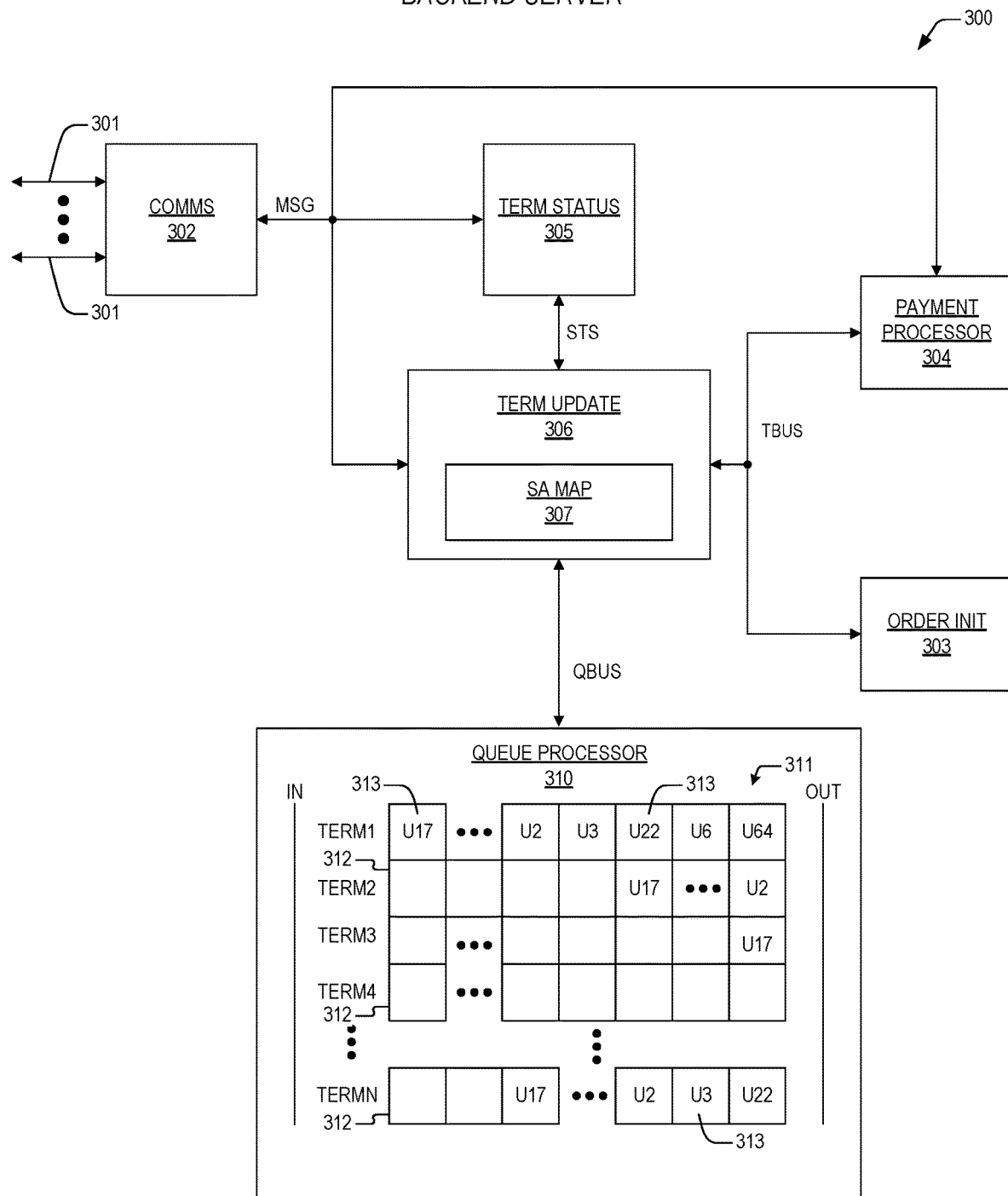
FIG. 3 is a block diagram featuring a backend server according to the present invention such as may be employed in the POS synchronization system of FIG. 1.

Now turning to FIG. 3, a block diagram is presented featuring a backend server 300 according to the present invention such as may be employed in the POS synchronization system of FIG. 1. The server 300 may comprise communications circuitry COMMS 302 (e.g., transceivers, modems, message formatter, etc.) that is coupled to one or more wired or wireless communications links 301, examples of which are described above with reference to FIG. 1. The server 300 may also comprise a terminal status element 305, a terminal update element 306 and a payment processor 304, each of which are coupled to COMMS 402 via a message bus MSG. The terminal status element 305 is coupled to the terminal update element 306 via a status bus STS. The terminal update element 306 may comprise a service area map SA MAP 307. The terminal update element 406 is coupled to the payment processor 304 and an order initiation element 303 via a terminal bus TBUS. The terminal update element 306 is also coupled to a queue processor 310 via a queue bus QBUS.

The queue processor 310 may include a durable terminal queue 411 that includes terminal update records 312, each of which are associated with a corresponding terminal, such as the terminals 111, 112, 121, 131, 151 discussed with reference to FIG. 1, that are employed within a given restaurant. In the embodiment of FIG. 3, N terminal update records 312 are shown, each associated with a corresponding one of N terminals for the given restaurant. In a large restaurant or big box environment, N may be roughly equal to 30 terminals, though larger and smaller numbers are contemplated. In one embodiment, an admin console, like the console 171 of FIG. 1, may be designated as a terminal in the queue 311 for updates and messaging.

Each of the terminal update records 312 may comprise update fields 313, which are employed to queue order updates for transmission to each of the corresponding terminals as connectivity to the corresponding terminals permits. Update fields 313 nearest to OUT are the oldest order updates queued for transmission to the corresponding terminals. Update fields 313 nearest to IN are youngest (or most recent) order updates queued for transmission to the corresponding terminals. Fields 313 between the oldest order updates and the youngest order updates descend in age from oldest to youngest update according to when those updates are received from others of the corresponding terminals.

Values of the order update fields 313 may include, but are not limited to, an order ID along with order details, including payment information, taken by the others of the corresponding terminals. Accordingly, the terminal update record 312 for terminal 1 TERM1 depicts a plurality of order update fields 313 to be transmitted to TERM1 when connectivity is reestablished with TERM1. In decreasing age from oldest to youngest order update, the fields 313 depict updates to order 64 U64, then order 6 U6, then order 22 U22, and so on, culminating with an update to order 17 U17. As one skilled in the art will appreciate, the terminal update record 312 for TERM1 is indicative that TERM1 has been offline (i.e., no connectivity) longer than any of the other terminals in the restaurant. This length of time may correspond to a mobile terminal that is serving a party on a restaurant porch that has poor Wi-Fi connectivity, or may correspond to a delivery terminal that is traversing an area with poor cellular coverage. The terminal update records 312 corresponding to TERM2, TERM 3, and TERMN depict a number of populated order update fields 313 less than the number of fields for TERM1, which may correspond to terminals within the restaurant that have only slightly intermittent connectivity. And the terminal update record for TERM4 contains only empty order update fields 313, thus indicated that this terminal is up to date on all order state changes within the restaurant.

Operationally, the terminal status element 305 may periodically transmit a first message to each of the terminals and update the connectivity status of the terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates. The acknowledge message may further comprise configuration identification data such as terminal configuration (e.g., mobile order entry, order processing, kiosk, management terminal).

The terminal status element 305 may provide connectivity status of each of the terminals to the terminal update element 306 via bus STS. The service area map 307 is a table that associates each of the terminals to one or more service areas within the restaurant, as described above with reference to FIG. 1. In one embodiment, the terminal update element 306 may generate order update messages from oldest to youngest update for each of the terminals that are connected. Connectivity is maintained when a terminal acknowledges receipt of an order update message. Once acknowledged, the terminal update element 306 directs the queue processor 310 to delete the oldest order update for that terminal and shift pending order updates so that the next oldest order update becomes the oldest order update. In one embodiment, order updates are transmitted to a given terminal until its terminal update record 312 is empty, or until connectivity is broken.

In one embodiment, all of the terminals associated with the restaurant are updated by the terminal update element 306. In an alternative embodiment, terminals are selectively updated in accordance with their mapping to the one or more service areas, as indicated by contents of the service area map 307. For example, delivery terminals may only require knowledge of orders that are to be delivered outside the restaurant, and thus they may be mapped to a "delivery" service area so that order updates that correspond to the delivery service area are transmitted to the delivery terminals. Similarly, the restaurant or retail establishment may be so large that management dedicates certain terminals to designate service areas. Accordingly, all of the terminals in a given service area may be employed to update any order placed within the given service area, but they may not be employed to update orders placed outside of the given service area. In like fashion, the service area map 307 may designate one or more of the terminals as an owner terminal operating in an owner mode, and may selectively update the owner terminals with information and messages that comport with management and finance of the restaurant, as is described above.

Messages received from the communications circuit 302 may also require additional functions to be performed by the backend server 300. For example, when orders are placed by a browser-based or third-party based terminal, the terminal update element 306 may transmit the order update to the order initiation element 303 via TBUS. The order initiation element 303 may then create an order ID for the order update and may assign the order ID to one or more of the terminals within the restaurant. Similarly, when an order update message received over the COMMS 402 requires processing of transactions outside of the terminals' capabilities (e.g., financial transactions with credit card providers, loyalty card discounts, merchant cash advance payments and holdback, etc.), the payment processor 304 may generate messages to the payment processing and financial institutions to complete the transactions and the messages are transmitted via COMMS 302. The payment processor 304 may further generate order updates (e.g., "order paid," "payment source 1 approved," "discount amount," etc.) to be transmitted to the terminals and may provide these updates to the terminal update element 306 via TBUS. The terminal update element 306 may then provide those updates to the durable queue 311 via QBUS, and the updates are transmitted to the POS terminals in due course dependent upon connection status, as is described above.

The backend server 300 according to the present invention is configured to perform the functions and operations as discussed above. The backend server 300 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the backend server 300 may be shared with other circuits, microcode, etc., that are employed to perform other functions and/or operations within the backend server 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The backend server 300 may be embodied as one or more central processing units (CPUs) that are coupled to transitory and non-transitory storage (i.e., memory), where one or more application programs that are configured to perform the functions discussed above are stored in the non-transitory storage, transferred to the transitory storage at run time, and executed by the one or more CPUs. The memory may comprise an operating system (OS), such as Android, iOS, MS Windows Mobile, etc. and one or more application programs that implement the functions noted above.

Figure 4:
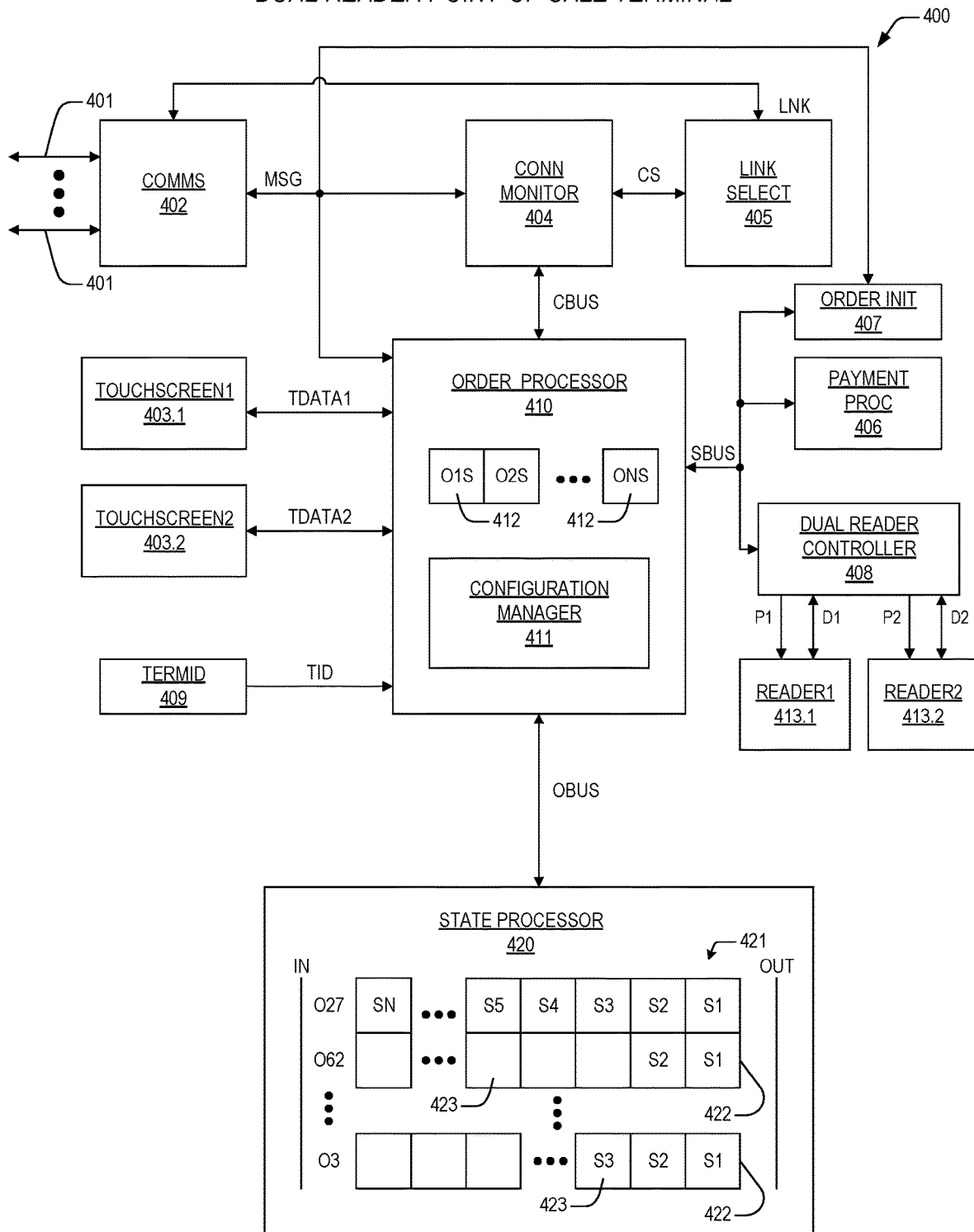
FIG. 4 is a block diagram showing a dual-reader POS terminal according to the present invention such as may be employed in the POS synchronization system of FIG. 1.

Now referring to FIG. 4, a block diagram is presented showing a dual-reader POS terminal 400 according to the present invention such as may be employed in the POS synchronization system of FIG. 1. For purposes of teaching aspects of the present invention, the dual-reader POS terminal 400 may preferably be disposed as a fixed POS terminal 400 powered via AC mains and attended by a restaurant employee, though it also may be disposed as a battery-operated POS terminal 400 attended by the restaurant employee. When in a fixed configuration, the POS terminal 400 may be hardwired to a gateway or may be coupled to the gateway via wireless access points, as described above with reference to FIG. 1. The terminal 400 may comprise a communications circuit COMMS 402 (e.g., transceivers, modems, message formatter, etc.) that is coupled to one or more wired or wireless communications links 401, examples of which are described above with reference to FIG. 1. The terminal 400 may also comprise a connection monitor 404, an order processor 410, and an order initiation element 407, all of which are coupled to COMMS 402 via a message bus MSG. The terminal 400 may also comprise a link select element 405 that is coupled to the connection monitor 404 via bus CS and to the COMMS 202 via bus LNK. The order processor 410 is coupled to the connection monitor 204 via bus CBUS and to the order initiation element 407, a payment processor 406, and a dual reader controller 408 via bus SBUS. The dual reader controller 408 is coupled to two card readers 413.1, 413.2 that each provide one or more of the capabilities (i.e., swipe, dip, tap) described above. Preferably, the card readers 413.1, 413.2 provide all three capabilities. The card readers 413.1, 413.2 may be of different types, protocols, and capabilities. The order processor 410 is coupled to two touchscreen displays 403.1, 403.2 via bus TDATA and to a terminal ID element 409 via bus TID. TOUCHSCREEN1 403.1 may be disposed as an employee-facing display 403.1 and TOUCHSCREEN2 403.2 may be disposed as a guest-facing display 403.2. READER1 413.1 may be associated with TOUCHSCREEN1 403.1 and READER2 413.2 may be associated with TOUCHSCREEN2 403.2. The readers 413.1, 413.2 may each be integrated into their corresponding touchscreen 403.1, 403.2 assemblies or they may be coupled to their corresponding touchscreen 403.1, 403.2 via cable.

The order processor 410 is also coupled to a state processor 420 via a queue bus QBUS. The state processor 220 may include a durable order update queue 221 that includes order update records 222, each of which are associated with a corresponding order for the terminal 200. Individual terminals 200 are identified by their corresponding terminal ID, which may be stored within and accessed from the terminal ID element 409. The terminal ID element 409 also is employed for storage and retrieval of terminal configuration information (e.g., order processing terminal configuration, kiosk configuration, mobile terminal configuration, host terminal configuration, owner mode terminal configuration, etc.).

Each of the order update records 422 may comprise order state fields 423, which are employed to queue order state changes (i.e., order updates) for transmission to a backend server (not shown) as connectivity to the backend server permits. State fields 423 nearest to OUT are the oldest order state changes queued for transmission to the backend server. State fields 423 nearest to IN are youngest (or most recent) order state changes queued for transmission to the backend server. Fields 423 between the oldest state fields 423 and the youngest state fields 423 descend in age from oldest to youngest order state change according to when those state changes are entered by the terminal 400.

Values of the order state fields 423 may include, but are not limited to, an order ID along with order details taken by the terminal 400. Accordingly, the order update record 422 for order 27 O27 depicts a plurality of order state fields 423 to be transmitted to the server when connectivity is reestablished. In decreasing age from oldest to youngest order state change, the fields 423 depict order state changes S1 through SN. As one skilled in the art will appreciate, the order update record 422 O27 depicts that many more state changes have been entered while connection status of the terminal 400 is down than have been entered for order 62 O62 through order 3 O3. Advantageously, the terminal 200 according to the present invention may be employed for entry of order updates even in the presence of network interruptions (which are characteristic of most Wi-Fi networks).

In operation, order state changes S1-SN result from two sources: the touchscreen 403 and messages received over COMMS 302 from the backend server. In the first case, wait staff may enter menu items as requested by guests, or in the case that the terminal 400 is configured as a kiosk 400, the guests may enter the order items themselves. The present invention contemplates provisions within the terminal 400 to display menu selections and payment options to both wait staff and guests. Order items received from the touchscreen displays 403.1, 403.2 are provided to the order processor 410 via bus TDATA, which generates the state changes. State changes S1-SN received from the backend server are provided to the order processor 410 via messages received over bus MSG. The terminal 400 may also be configured to operate in an owner mode that comprises the owner functions discussed above with reference to FIG. 1.

The connection monitor 404 may monitor reception of a first message (e.g., a ping message) from the backend server and direct transmission of an acknowledgement message. The connection monitor 404 may update the connectivity status of the terminal 400 accordingly. In one embodiment, acknowledgment may comprise a simple acknowledge message. In other embodiments, acknowledgement may comprise additional data such as received signal strength indication RSSI associated with one or more access points, number of hops between the backend server and the terminal 400, or Global Positioning System (GPS) coordinates.

The link select element 405 may be employed to direct the COMMS 202 to change links 401 over which to communicate with the backend server, such as switching from Wi-Fi to LTE, for example. In one embodiment, in the absence of connectivity within the restaurant, the link select element 405 may direct the COMMS 402 to tether to a cellular equipped device corresponding to an order ID, such as device 106 in FIG. 1, in order to transmit acknowledgements and order state changes to the backend server.

The connection monitor 404 may provide connectivity status of the terminal 400 to the order processor 410 via bus CBUS. In one embodiment, the order processor 410 may generate order state change messages from oldest to youngest update for each of the orders in the queue 421. Connectivity is maintained when the terminal 400 receives acknowledgement of a previously transmitted order state change message from the backend server. Once acknowledged, the order processor 410 directs the state processor 420 to delete the oldest state change update for a corresponding order ID and shift pending updates so that the next oldest state change update becomes the oldest order update. In one embodiment, state change updates are transmitted to the backend server until its order state change record 422 is empty, or until connectivity goes down.

As discussed above, the terminal 400 may be configured as a fixed POS terminal, a host/payment terminal, a management terminal, an order processing terminal, or an owner mode terminal, where configurations differ principally in size and type of displayed items and available functions and controls. The configuration parameters for the terminal 400 are stored in the terminal ID 409 element, and the configuration parameters/features are accessed by a configuration manager 411 within the order processor 410 upon initialization/reconfiguration of the terminal 400. Thus, the configuration manager 4211 may generate images for display on the touchscreen 403 and capture text and touches thereon, in accordance with functions prescribed according to configuration parameters/features accessed from the terminal ID element 409.

Messages received from the communications circuit 402 may also require additional functions to be performed by the terminal 400. For example, when orders are placed by a browser-based or third-party based terminal, the backend server may transmit the order state change to the terminal 400 and the order processor 410 may direct the state processor 420 to create a corresponding order status record 422 in the queue 421. Similarly, when processing of transactions outside of the terminal's capabilities (e.g., financial transactions with credit card processors, loyalty card discounts, customer relationship management functions, etc.) are required, order processor 410 may direct the payment processor 406 to generate messages to the backend server to provide data (e.g., amounts, payment source type, card swipe/chip information, etc.) to complete the transactions. Such messages are transmitted via COMMS 402.

Based upon directives from the order processor 410, the payment processor 406, via SBUS, may direct the dual reader controller 408 to perform any of a number of functions associated with a card reader 413 including, but not limited to, swipe login for employees; swipe for manager approval of a transaction; swipe for guest age verification, swipe or dip for gift card; and swipe, dip, or tap for credit card payment. In one embodiment, READER1 413.1 is coupled to the dual reader controller 408 via power bus P1 and bidirectional data bus D1 and READER2 413.2 is coupled to the dual reader controller 408 via power bus P2 and bidirectional data bus D2. The power buses P1-P2 are employed to provide operating power to their respective reader 413.1, 413.2 and the data buses D1-D2 are employed to transmit commands to their respective reader 413.1, 413.2 to change state, as will be described in more detail below, and to receive data from their respective reader 413.1, 413.2 that is obtained during a swipe, dip, or tap operation. In accordance with the directives, the dual reader controller 408 may place a designated reader 413.1, 413.2 in a state to accept a swipe, to accept a dip, to expect a tap, or to accept any combination of swipe, dip, and tap commensurate with workflow of the terminal 400, which includes an indication of which card reader 413.1, 413.2 is designated to read information from a card (e.g., guest credit card, employee login card, manager approval card, gift card, loyalty card, etc.). When one of the readers 413.1, 413.2 is enabled to accept information from a card, the reader controller 408 may further direct the other reader 413.1, 413.2 to go into a standby state, where the other reader 413.1, 413.2 is powered up but unable to accept information from a swipe, dip, or tap. In one embodiment, buses P1 and D1 and P2 and D2 are disposed within respective conventional Universal Serial Bus (USB) cable interfaces that operate in accordance with USB 2.0/3.0 protocol standards. As such, the dual reader controller 408 may obtain the type and capabilities of each of the readers 413.1, 413.2 upon conventional power up discovery techniques.

The dual reader controller 408 according to the present invention may further be configured to couple via P1 and D1 and P2 and D2 to two of several different types of readers 413.1, 413.2 having differing data formats and interface protocols (e.g., asynchronous, synchronous, etc.) and may perform translation of directives received from the order processor 410 into reader-specific commands that correspond to each reader type and capabilities obtained during USB discovery to direct the respective reader 413.1, 413.2 to perform the functions noted above. Likewise, the dual reader controller 408 may receive reader-specific formatted data (including card information) from each of the readers 413.1, 413.2 and may translate the reader-specific formatted data into a common format for presentation to the order processor 410 via SBUS.

The dual reader processor 408 may additionally direct one or both of the readers 413.1, 413.2 to change operating state based upon workflow state of the POS terminal 400 and may further power down one or both of the reader 413.1, 413.2 for workflow states that do not require reader functions in order to minimize power consumption. As an example, when the POS terminal 400 is expecting an employee login, the dual reader controller 408 may place READER1 413.1 in a full power mode and direct READER1 413.1 to expect a swipe and may place READER2 413.2 in a standby mode. If no swipe is received in a programmable period of time, then the dual reader controller 408 may place READER1 in a standby mode. If a user re-enables a login (by touching a "login" icon on TOUCHSCREEN1 403.1), then the dual reader controller 408 may place READER1 413.1 in a full power mode and direct READER1 413.1 to expect a swipe.

The payment processor 404 may further receive state changes (e.g., "order paid," "payment source 1 approved," "discount amount," etc.) from the backend server via SBUS. The order processor 410 may then provide those updates to the queue 421 via OBUS. The POS terminal 400 may further be employed to create an order. Accordingly, from order entry data received over TDATA, the order processor 410 may direct the order initiation element 407 to request an order ID from the backend server via MSG and may also direct the state processor 420 to create a corresponding order state record 422 in the queue 421 based upon the order ID received from the backend server.

The terminal 400 according to the present invention is employed to maintain a current state of all orders being fulfilled by the restaurant. The current state of each of the orders is stored in order current state fields 412 within the order processor 410. The order processor 410 may also comprise domain specific rules (not shown), which define actions required to synchronize conflicting order state changes being received and/or processed by the terminal 400, where the domain specific rules are unique to the restaurant. For example, suppose that one terminal 400 transmits a state change for a specific order to the backend server, which is acknowledged by the backend server. Concurrently, a second terminal 400 sends a state change for the same order. The backend server may respond to the second terminal with a message indicating that the order current state field 412 for the order ID within the second POS terminal 400 state is out of date (due to connection status) and providing the most recent current state of the order. The domain specific rules are employed by the order processor 410 within the second terminal 400 to merge the state changes local to the second terminal 400 and may store the merged state in the corresponding current state field 412. The order processor 410 may then direct the COMMS 402 to transmit the corresponding (reconciled) state field 412 contents to the backend server for distribution to all of the terminals 400 in the restaurant.

The POS terminal 400 according to the present invention is configured to perform the functions and operations as discussed above. The terminal 400 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 400 may be shared with other circuits, microcode, etc., that are employed to perform other functions and/or operations within the terminal 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The terminal 400 may be embodied as one or more central processing units (CPUs) that are coupled to transitory and non-transitory storage (i.e., memory), where one or more application programs that are configured to perform the functions discussed above are stored in the non-transitory storage, transferred to the transitory storage at run time, and executed by the one or more CPUs. The memory may comprise an operating system (OS), such as Android, iOS, MS Windows Mobile, etc. and one or more application programs that implement the functions noted above.

Figure 5:
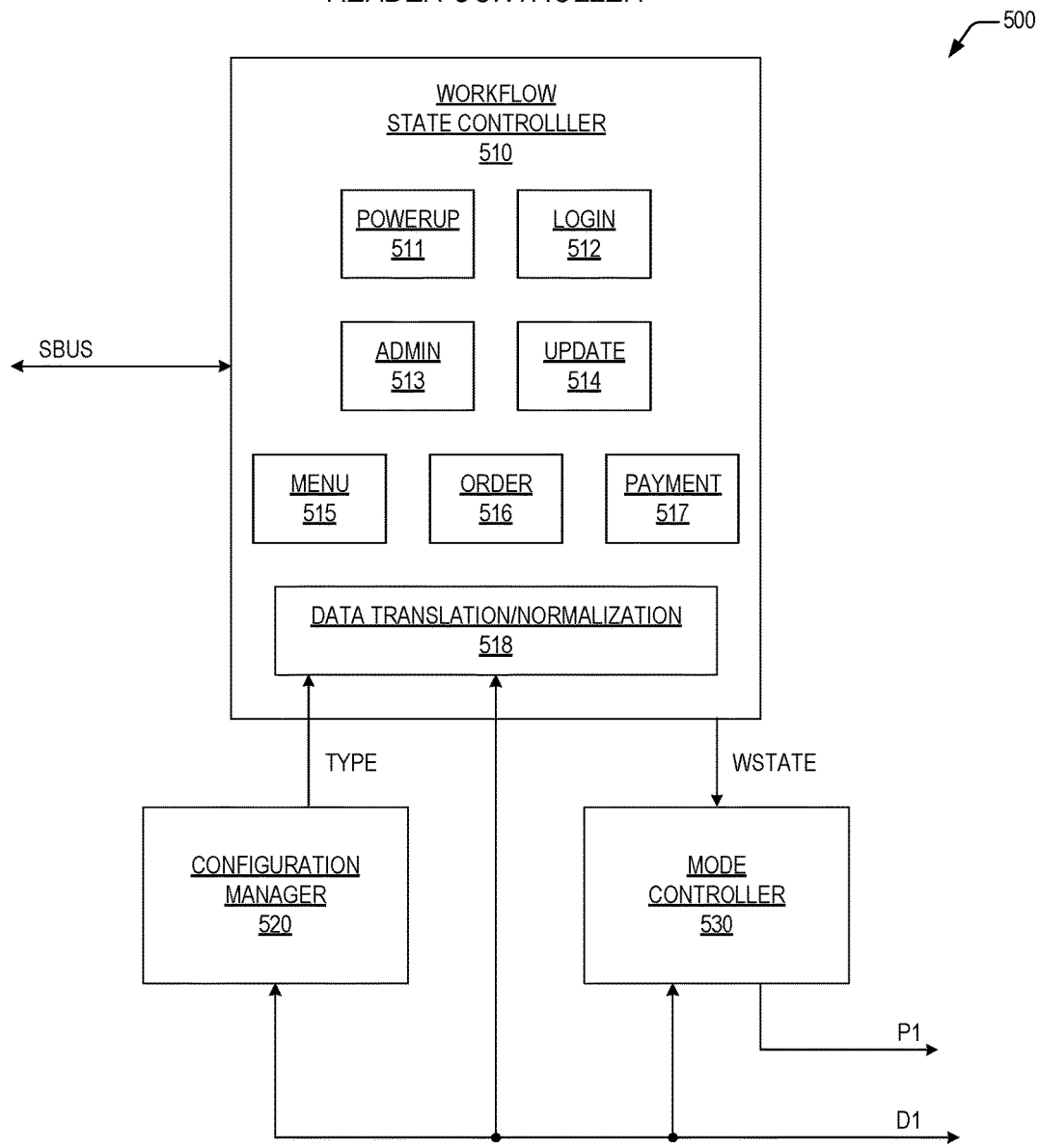
FIG. 5 is a block diagram illustrating a reader controller according to the present invention such as may be employed in the single-reader POS terminal of FIG. 2.

Turning to FIG. 5, a block diagram is presented illustrating a reader controller 500 according to the present invention such as may be employed in the single-reader POS terminal of FIG. 2. The reader controller 500 may include a workflow state controller 510 that is coupled to bus SBUS (which is coupled to order processor 210). The state controller 510 is also coupled to a configuration manager 520 via bus TYPE, to a single card reader via data bus D1, and to a mode controller 530 via bus WSTATE. The mode controller 530 is coupled to the card reader via power bus P1 and data bus D1. A data translation/normalization element 518 within the workflow state controller is also coupled to bus D1.

In an exemplary embodiment, the workflow state controller 510 may include a powerup state processor 511, a login processor 512, an admin processor 513, an update processor 514, a menu processor 515, an order processor 516, and a payment processor 517, where one of the processors 511-517 is activated via directives received from the order processor 210 over SBUS.

In operation, when powered up, the powerup processor 511 may direct the mode controller 530 to execute USB discovery on the card reader via P1 and D1, where the configuration manager 520 determines the type and capabilities of the card reader. In turn, the configuration manager 520 may provide instructions via TYPE to the data translation/normalization element 518 that enable the data translation/normalization element 518 to communicate with the reader according to its specific protocol based upon a common set of commands for all readers and to extract and interpret card data provided by the reader. The data translation/normalization element 518 may subsequently format the extracted and interpreted card data into a format for presentation that is common to all readers. The configuration manager 520, mode controller 530, and data translation/normalization element 518 are also configured to provide for a common reader update interface that supports updates (e.g., security updates, support for new card brands, configuration settings, etc.) of different update type (e.g., local file transfer versus remote server connection).

The mode controller 530 may function to place the reader in one of several states that correspond to an activated one of the processors 511-517 and may additionally utilize an internal timer to determine if an expected action has taken place and, if not, place the reader in a different one of the several states, as will be discussed below with reference to FIGS. 7-8. The present inventors note that the processors 511-517 depicted in the exemplary reader controller 500 are provided to teach relevant aspects of the present invention; however, the number and type of processors 511-517 may be readily modified to comport with differing POS terminal workflow states according to usage and configuration.

Figure 6:
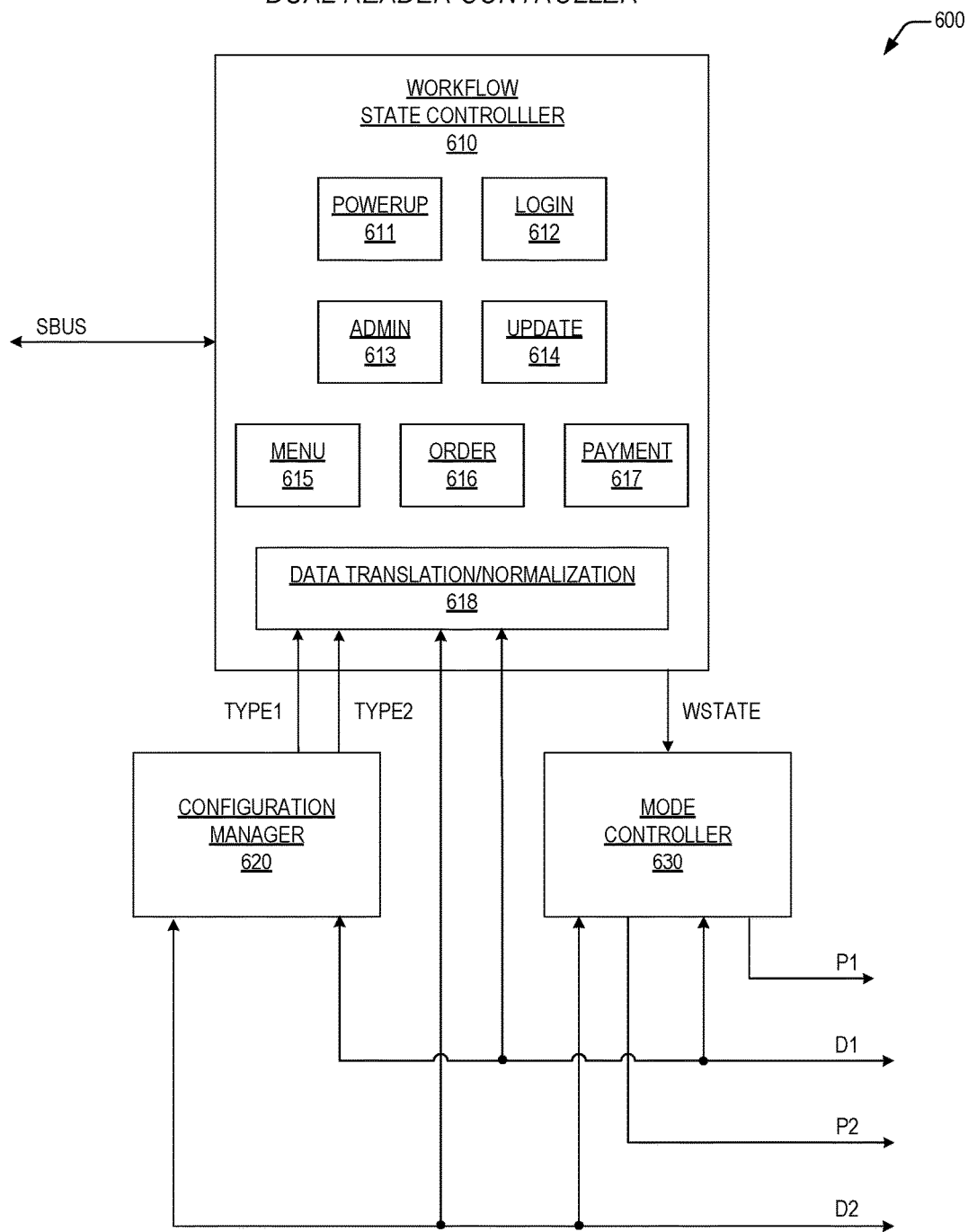
FIG. 6 is a block diagram detailing a dual reader controller according to the present invention such as may be employed in the dual-reader POS terminal of FIG. 4.

Referring to FIG. 6, a block diagram is presented detailing a dual reader controller 600 according to the present invention such as may be employed in the dual-reader POS terminal of FIG. 4. The dual reader controller 600 may include a workflow state controller 610 that is coupled to bus SBUS (which is coupled to order processor 410). The state controller 610 is also coupled to a configuration manager 620 via buses TYPE1 and TYPE2, to two card readers via data buses D1 and D2, and to a mode controller 630 via bus WSTATE. The mode controller 630 is coupled to the two card readers respectively via power buses P1 and P2 and data buses D1 and D2. A data translation/normalization element 618 within the workflow state controller is also coupled to buses D1 and D2.

In an exemplary embodiment, the workflow state controller 610 may include a powerup state processor 611, a login processor 612, an admin processor 613, an update processor 614, a menu processor 615, an order processor 616, and a payment processor 617, where one of the processors 611-617 is activated via directives received from the order processor 410 over SBUS.

In operation, when powered up, the powerup processor 611 may direct the mode controller 630 to execute USB discovery on the card readers via P1/D1 and P2/D2, where the configuration manager 620 determines the type and capabilities of each of the card readers. In turn, the configuration manager 620 may provide instructions via TYPE1 and TYPE2 to the data translation/normalization element 618 that enable the data translation/normalization element 618 to communicate with each of the readers according to their respective specific protocol based upon a common set of commands for all readers and to extract and interpret card data provided by each of the readers. The data translation/normalization element 618 may subsequently format the extracted and interpreted card data into a format for presentation that is common to all readers. The configuration manager 620, mode controller 630, and data translation/normalization element 618 are also configured to provide for a common reader update interface that supports updates (e.g., security updates, support for new card brands, configuration settings, etc.) of different update type (e.g., local file transfer versus remote server connection).

The mode controller 630 may function to place one or more of the readers in one of several states that correspond to an activated one of the processors 611-617 and may additionally utilize internal timers to determine if an expected action has taken place and, if not, place one or more of the readers in a different one of the several states, as will be discussed below with reference to FIGS. 7-8. The present inventors note that the processors 611-617 depicted in the exemplary dual reader controller 600 are provided to teach relevant aspects of the present invention; however, the number and type of processors 611-617 may be readily modified to comport with differing POS terminal workflow states according to usage and configuration.

Figure 7:
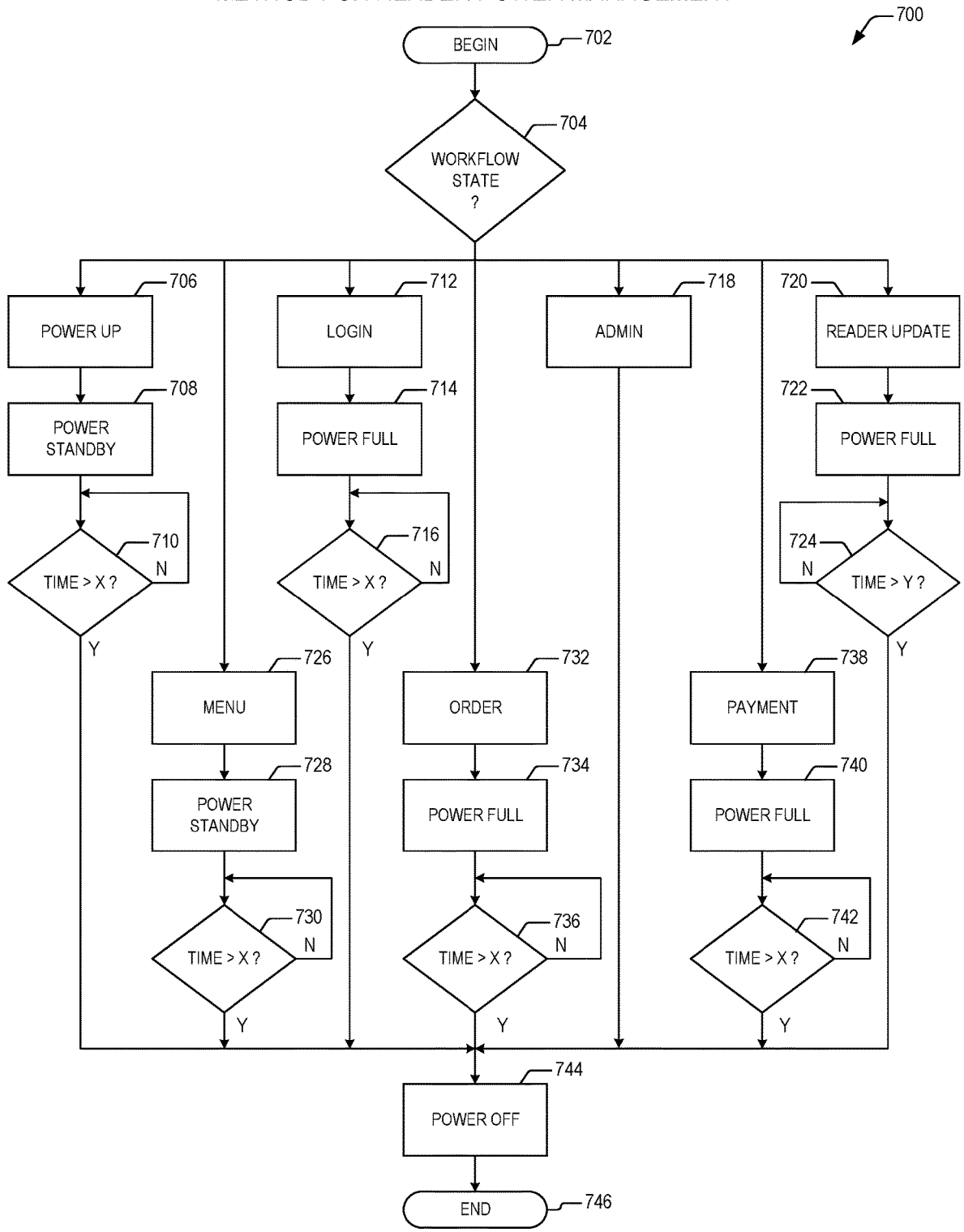
FIG. 7 is a flow diagram illustrating a method for power management of a card reader according to the present invention such as may be employed to extend battery life of the single-reader POS terminal of FIG. 2.

Now turning to FIG. 7, a flow diagram 700 is presented illustrating a method for power management of a card reader according to the present invention such as may be employed to extend battery life of the single-reader POS terminal of FIG. 2. Flow begins at block 702, where a reader controller, such as the controller 500 of FIG. 5, executes to control states of a card reader to which it is coupled. Flow then proceeds to decision block 704.

At decision block 704, the reader controller 500 communicates with the order processor 210 to determine a workflow state that the POS terminal 200 is operating in. If in a power up state, flow proceeds to block 706. If in a login state, flow proceeds to block 712. If in an admin state, flow proceeds to block 718. If in a reader update state, flow proceeds to block 720. If in a menu state, flow proceeds to block 726. If in an order state, flow proceeds to block 732. If in a payment state, flow proceeds to block 738.

At block 706, the reader controller 500 starts a timer and transfers control to block 708.

At block 708, the reader controller 500 powers the reader via P1 and directs the reader via D1 to enter into a standby mode. Flow then proceeds to decision block 710.

At decision block 710, the timer is evaluated to determine if an amount of time has passed that is greater than a programmable timeout parameter X, preferably 15 minutes, though other values of the parameter are contemplated to comport with intended use. If less than X time has elapsed, then flow proceeds to decision block 710. If more than X time has elapsed, then flow proceeds to block 744.

At block 712, the reader controller 500 notes that a login screen has been presented for an employee card swipe and starts a timer and transfers control to block 714.

At block 714, the reader controller 500 powers the reader via P1 and directs the reader via D1 to enter into a full power mode to accept the swipe. Flow then proceeds to decision block 716.

At decision block 716, the timer is evaluated to determine if an amount of time has passed that is greater than a programmable timeout parameter X, preferably 15 minutes, though other values of the parameter are contemplated to comport with intended use. If less than X time has elapsed, then flow proceeds to decision block 716. If more than X time has elapsed, then flow proceeds to block 744. Thus, the employee is given X time to swipe their employee ID; else, they must re-enable login, typically by activating an icon on the POS touchscreen.

At block 718, the reader controller 500 notes that the POS terminal is in a workflow state that does not require use of the card reader and thus flow is transferred to block 744.

At block 720, the reader controller 500 notes that the POS terminal has entered a reader update state (for update of firmware) and starts a timer and transfers control to block 722.

At block 722, the reader controller 500 powers the reader via P1 and directs the reader via D1 to enter into a full power mode to perform the update. Flow then proceeds to decision block 724.

At decision block 724, the timer is evaluated to determine if an amount of time has passed that is greater than a programmable timeout parameter Y, preferably 60 minutes, though other values of the parameter are contemplated to comport with intended use. If less than Y time has elapsed, then flow proceeds to decision block 724. If more than Y time has elapsed, then flow proceeds to block 744. Thus, the reader is given Y time to perform the firmware update.

At block 7626, the reader controller 500 notes that the terminal is in a menu state (i.e., displaying screens to the employee or guest that provide menu items for selection) and starts a timer and transfers control to block 728.

At block 728, the reader controller 500 powers the reader via P1 and directs the reader via D1 to enter into a standby mode. Flow then proceeds to decision block 730.

At decision block 730, the timer is evaluated to determine if an amount of time has passed that is greater than a programmable timeout parameter X, preferably 15 minutes, though other values of the parameter are contemplated to comport with intended use. If less than X time has elapsed, then flow proceeds to decision block 730. If more than X time has elapsed, then flow proceeds to block 744.

At block 732, the reader controller 500 notes that the POS terminal has entered into an order state (via selection of a menu item to initiate an order) and starts a timer and transfers control to block 734.

At block 734, the reader controller 500 powers the reader via P1 and directs the reader via D1 to enter into a full power mode, thus allowing a guest to pay at any time during the order process. Flow then proceeds to decision block 736.

At decision block 736, the timer is evaluated to determine if an amount of time has passed that is greater than a programmable timeout parameter X, preferably 15 minutes, though other values of the parameter are contemplated to comport with intended use. If less than X time has elapsed, then flow proceeds to decision block 736. If more than X time has elapsed, then flow proceeds to block 744. Thus, the guest is given X time to pay for their order; else, this workflow state must be refreshed via selecting other items to add to the order, or it must change to a payment state.

At block 738, the reader controller 500 notes that the POS terminal has entered into a payment state (via selection payment icon displayed on an order screen) and starts a timer and transfers control to block 740.

At block 740, the reader controller 500 powers the reader via P1 and directs the reader via D1 to enter into a full power mode, thus allowing a guest to pay. Flow then proceeds to decision block 742.

At decision block 742, the timer is evaluated to determine if an amount of time has passed that is greater than a programmable timeout parameter X, preferably 15 minutes, though other values of the parameter are contemplated to comport with intended use. If less than X time has elapsed, then flow proceeds to decision block 742. If more than X time has elapsed, then flow proceeds to block 744. Thus, the guest is given X time to pay for their order; else, this workflow state must be refreshed via selecting the payment icon again.

At block 744, the reader controller 500 powers down the card reader by removing power from P1. Flow then proceeds to block 746.

At block 746, the method completes.

The present inventors note that the POS terminal workflow states 706, 712, 718, 720, 726, 732, 740 depicted in the exemplary method for power management are provided to teach relevant aspects of the present invention; however, the number and type of processors 706, 712, 718, 720, 726, 732, 740 may be readily modified to comport with differing POS terminal workflow states according to usage and configuration.

Figure 8:
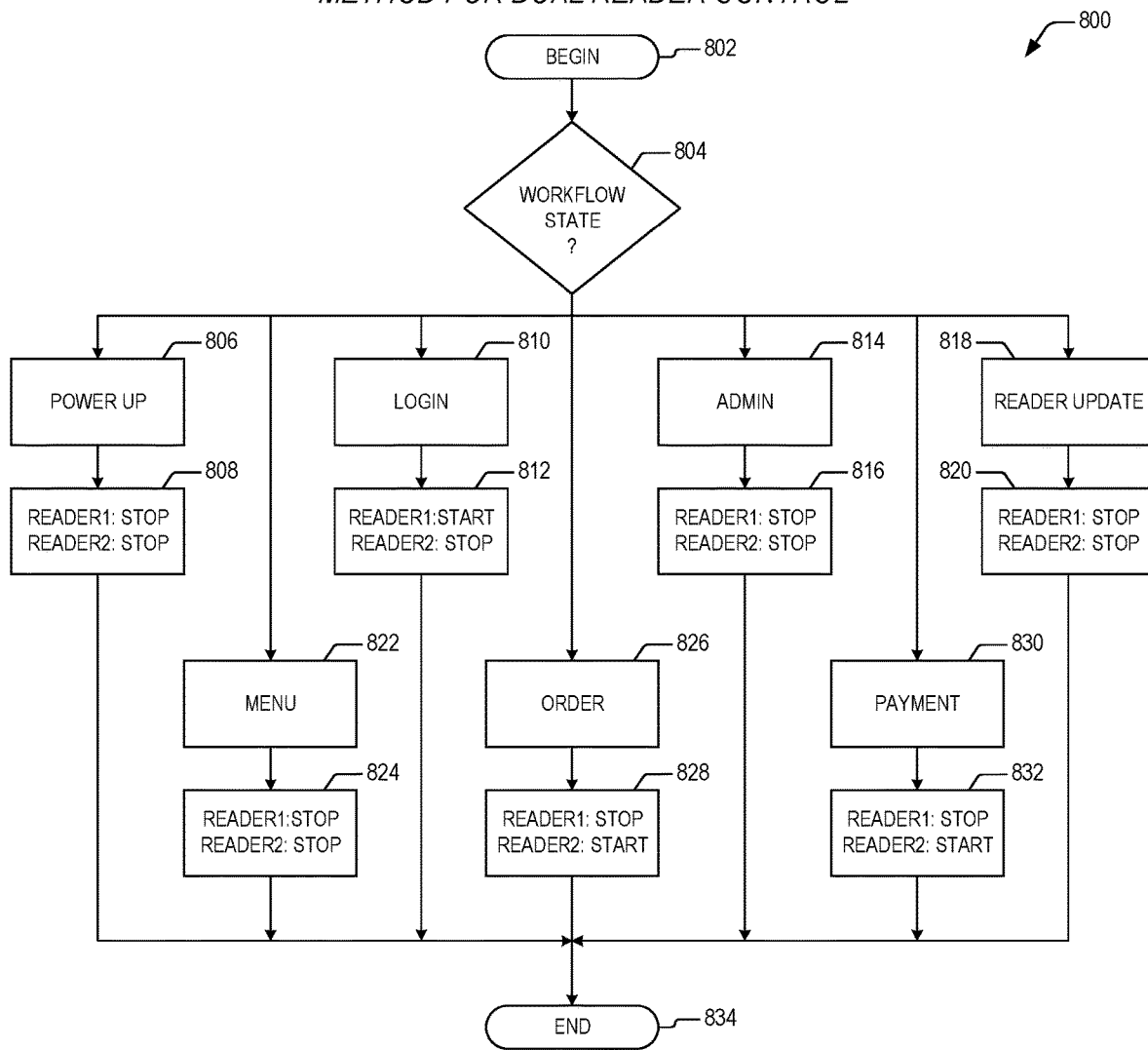
FIG. 8 is a flow diagram depicting a method for controlling two card readers according to the present invention such as may be employed in the dual-reader POS terminal of FIG. 4.

FIG. 8 is a flow diagram 800 depicting a method for controlling two card readers according to the present invention such as may be employed in the dual-reader POS terminal of FIG. 4. Flow begins at block 802, where a dual reader controller, such as the controller 600 of FIG. 6, executes to control states of both card readers READER1, READER2 to which it is coupled. Flow then proceeds to decision block 804.

At decision block 804, the reader controller 500 communicates with the order processor 210 to determine a workflow state that the POS terminal 200 is operating in. If in a power up state, flow proceeds to block 806. If in a login state, flow proceeds to block 810. If in an admin state, flow proceeds to block 814. If in a reader update state, flow proceeds to block 818. If in a menu state, flow proceeds to block 822. If in an order state, flow proceeds to block 826. If in a payment state, flow proceeds to block 830.

At block 806, the controller 600 notes the POS terminal is in a power up state and transfers flow to block 808.

At block 808, the controller 600 directs both readers READER1, READER2 to enter a stop read mode since reading of cards is not provided for during power up of the terminal. Flow then proceeds to block 834.

At block 810, the controller notes the POS terminal is in a login state and transfers control to block 812.

At block 812, the controller 600 directs READER 1 (corresponding to an employee-facing touchscreen display) to enter a start read mode (because a swipe of an employee ID is expected) and directs READER 2 to enter a stop read mode. Flow then proceeds to block 834.

At block 814, the controller 600 notes that the POS terminal has entered a mode in which no input is required from either of the readers. Flow then proceeds to block 816.

At block 816, the controller 600 directs both readers to enter a stop read mode, since no input is expected from either the employee-facing or guest-facing sides. Flow then proceeds to block 834.

At block 818, the controller 600 notes that the POS terminal has entered a reader update mode, where one or more of the readers is required to access updates either directly coupled or online and to update firmware thereon. Flow then proceeds to block 820.

At block 820, the controller 600 directs both readers to enter a stop read mode, since no input is expected. Flow then proceeds to block 834.

At block 822, the controller 600 notes that the POS terminal has entered a menu mode, enabling either an employee or guest (or both) to scan menu items for selection. Flow then proceeds to block 824.

At block 824, the controller 600 directs both readers to enter a stop read mode, since no menu items have been added to an order and, thus, no card inputs are expected. Flow then proceeds to block 834.

At block 826, the controller 600 notes that the POS terminal has entered an order mode, indicating that an employee or guest has selected at least one menu item to add to a corresponding order and, thus, card input is preferably allowed from READER2 (the guest-facing display reader). Flow then proceeds to block 828.

At block 828, the controller 600 directs READER1 to enter a stop read mode and READER2 to enter a start read mode, thus allow the guest to enter card information in the form of loyalty cards, gift cards, debit cards, and credit cards via swipe, dip, or tap. Flow then proceeds to block 834.

At block 830, the controller 600 notes that the POS terminal has entered a payment mode, payment is required from a guest and, thus, card input is preferably allowed from READER2 (the guest-facing display reader). Flow then proceeds to block 828.

At block 828, the controller 600 directs READER1 to enter a stop read mode and READER2 to enter a start read mode, thus allow the guest to enter payment information in the form of loyalty cards, gift cards, debit cards, and credit cards via swipe, dip, or tap. Flow then proceeds to block 834.

At block 834, the method completes.

The present inventors note that the POS terminal workflow states 806, 810, 814, 818, 822, 826, 830 depicted in the exemplary method for power management are provided to teach relevant aspects of the present invention; however, the number and type of processors 806, 810, 814, 818, 822, 826, 830 may be readily modified to comport with differing POS terminal workflow states according to usage and configuration.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer program product, a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices. The devices may comprise one or more CPUs that are coupled to a computer-readable storage medium. Computer program instructions for these devices may be embodied in the computer-readable storage medium. When the instructions are executed by the one or more CPUs, they cause the devices to perform the above-noted functions, in addition to other functions.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. An apparatus for dynamic credit card reader mode management, the apparatus comprising:

a point-of sale (POS) terminal, configured to accept employee login credentials via a magnetic stripe card, to display menu items for selection, to add selected menu items to an order, and to accept payment for said order, wherein said payment may be obtained via swipe, dip, or tap, said POS terminal comprising:

a first card reader, configured to read first provided cards when enabled;

a second card reader, configured to read second provided cards when enabled; and a dual reader controller, coupled to said first and second card readers, configured to determine one or more workflow states of said POS terminal, and configured to dynamically control modes of said first and second card readers according to said one or more workflow states, said dual reader controller comprising:

a configuration manager, coupled to said first card reader, configured to determine a type and capabilities of said first card reader upon power up of said first credit card reader; and a data translation/normalization processor, coupled to said configuration manager and said first card reader, configured to;

receive instructions from said configuration manager indicating said type and said capabilities;

communicate with sadi first card reader according to said type and said capabilities responsive to a common set of commands employed by said POS terminal; and format data received from said firt credit card reader into a common data format.

2. The apparatus for as recited in claim 1, wherein said workflow states comprise a power up state, a login state, a reader update state, a menu state, an order state, and a payment state.

3. The apparatus as recited in claim 2, wherein, upon entry of said POS terminal into said power up state, said dual reader controller places said first and second card readers into a stop read mode, thereby precluding reading of said first and second provided cards, respectively.

4. The apparatus as recited in claim 2, wherein, upon entry of said POS terminal into said login state, said dual reader controller places said first card reader into a start read mode and said second card reader into a stop read mode, thereby enabling reading of said magnetic stripe card and precluding reading of said second provided cards, wherein said magnetic stripe card comprises one of said first provided cards.

5. The apparatus as recited in claim 2, wherein, upon entry of said POS terminal into said reader update state, said dual reader controller places said first and second card readers into a stop read mode, thereby precluding reading of said first and second provided cards, respectively.

6. The apparatus as recited in claim 2, wherein, upon entry of said POS terminal into said order mode, said dual reader controller places said first card reader into a stop read mode and said second card reader into a start read mode, thereby enabling reading of one or more of said second provided cards and precluding reading of said first provided cards, wherein said second provided cards comprise loyalty cards, gift cards, debit cards, and credit cards provided for payment of said order.

7. The apparatus as recited in claim 2, wherein, upon entry of said POS terminal into said payment mode, said dual reader controller places said first card reader into a stop read mode and said second card reader into a start read mode, thereby enabling reading of one or more of said second provided cards and precluding reading of said first provided cards, wherein said second provided cards comprise loyalty cards, gift cards, debit cards, and credit cards provided for payment of said order.

8. An apparatus for dynamic credit card reader mode management, the apparatus comprising:

a point-of sale (POS) terminal, configured to accept employee login credentials via a magnetic stripe card, to display menu items for selection, to add selected menu items to an order, and to accept payment for said order, wherein said payment may be obtained via swipe, dip, or tap, said POS terminal comprising:

a first card reader, configured to read first provided cards when enabled;

a second card reader, configured to read second provided cards when enabled;

a dual reader controller, coupled to said first and second card readers, configured to determine one or more workflow states of said POS terminal, and configured to dynamically control mode of said first and second card readers according to said one or more workflow states, said dual reader controller comprising;

a configuration manager, coupled to said first card reader, configured to determine a type and capabilities of said first card reader upon power up of said first credit card reader; and a data translation/normalization processor, coupled to said configuration manager and said first card reader, configured to;

receive instructions from said configuration manger indicating said type and said capabilities;

communication with said first card reader according to said type and said capabilities responsive to a common set of commands employed by said POS terminal; and format data received from said first credit card reader into a common data format; and an order processor, coupled to said dual reader controller, configured to set said workflow state of said POS terminal based upon commands received from a back-end server and entries via touchscreens that are disposed within said POS terminal.

9. The apparatus for as recited in claim 8, wherein said workflow states comprise a power up state, a login state, a reader update state, a menu state, an order state, and a payment state.

10. The apparatus as recited in claim 9, wherein, upon entry of said POS terminal into said power up state, said dual reader controller places said first and second card readers into a stop read mode, thereby precluding reading of said first and second provided cards, respectively.

11. The apparatus as recited in claim 9, wherein, upon entry of said POS terminal into said login state, said dual reader controller places said first card reader into a start read mode and said second card reader into a stop read mode, thereby enabling reading of said magnetic stripe card and precluding reading of said second provided cards, wherein said magnetic stripe card comprises one of said first provided cards.

12. The apparatus as recited in claim 9, wherein, upon entry of said POS terminal into said reader update state, said dual reader controller places said first and second card readers into a stop read mode, thereby precluding reading of said first and second provided cards, respectively.

13. The apparatus as recited in claim 9, wherein, upon entry of said POS terminal into said order mode, said dual reader controller places said first card reader into a stop read mode and said second card reader into a start read mode, thereby enabling reading of one or more of said second provided cards and precluding reading of said first provided cards, wherein said second provided cards comprise loyalty cards, gift cards, debit cards, and credit cards provided for payment of said order.

14. The apparatus as recited in claim 9, wherein, upon entry of said POS terminal into said payment mode, said dual reader controller places said first card reader into a stop read mode and said second card reader into a start read mode, thereby enabling reading of one or more of said second provided cards and precluding reading of said first provided cards, wherein said second provided cards comprise loyalty cards, gift cards, debit cards, and credit cards provided for payment of said order.

15. A method for dynamic credit card reader mode management, the method comprising:
- providing a point-of sale (POS) terminal that is configured to accept employee login credentials via a magnetic stripe card, to display menu items for selection, to add selected menu items to an order, and to accept payment for the order, wherein the payment may be obtained via swipe, dip, or tap;
- via a first card reader disposed as part of the POS terminal, first reading first provided cards when fully powered and enabled; and
- via a second card reader disposed as part of the POS terminal, second reading second provided cards when fully powered and enabled; and
- via a dual reader controller that is coupled to the first and second card readers, determining one or more workflow states of the POS terminal, and dynamically controlling modes of the first and second card readers according to the one or more workflow states;
- determining a type and capabilities of the first credit card reader upon power up of the first credit card reader;
- receiving instructions indicating the type and the capabilities and communicating with the first credit card reader according to the type and the capabilities responsive to a common set of commands employed by the POS terminal, and formatting data received from the first credit card reader into a common data format.

16. The method for as recited in claim 15, wherein the workflow states comprise a power up state, a login state, a reader update state, a menu state, an order state, and a payment state.

17. The method for as recited in claim 15, wherein, upon entry of the POS terminal into the power up state, the dual reader controller places the first and second card readers into a stop read mode, thereby precluding reading of the first and second provided cards, respectively.

18. The method for as recited in claim 15, wherein, upon entry of the POS terminal into the login state, the dual reader controller places the first card reader into a start read mode and the second card reader into a stop read mode, thereby enabling reading of the magnetic stripe card and precluding reading of the second provided cards, wherein the magnetic stripe card comprises one of the first provided cards.

19. The method for as recited in claim 15, wherein, upon entry of the POS terminal into the reader update state, the dual reader controller places the first and second card readers into a stop read mode, thereby precluding reading of the first and second provided cards, respectively.

20. The method for as recited in claim 15, wherein, upon entry of the POS terminal into the order mode, the dual reader controller places the first card reader into a stop read mode and the second card reader into a start read mode, thereby enabling reading of one or more of the second provided cards and precluding reading of the first provided cards, wherein the second provided cards comprise loyalty cards, gift cards, debit cards, and credit cards provided for payment of the order.

* * * * *